United States Patent [19]
Yang

[11] Patent Number: 5,562,566
[45] Date of Patent: Oct. 8, 1996

[54] DISTRIBUTED DIFFERENTIAL MIXING COMBINED POWER SYSTEM

[76] Inventor: Tai-Her Yang, No. 32 La. 29, Taipin St., Si-Hu Town Dzan-Hwa, Taiwan

[21] Appl. No.: 317,633

[22] Filed: Oct. 3, 1994

[51] Int. Cl.$^6$ .................................................. B60K 1/02
[52] U.S. Cl. ................................. 477/3; 475/5; 180/65.2; 180/65.6
[58] Field of Search ............................... 477/3; 475/1, 5; 180/65.2, 65.3, 65.4, 65.6, 65.7

[56] References Cited

U.S. PATENT DOCUMENTS

| | | | |
|---|---|---|---|
| 4,309,620 | 1/1982 | Bock | 180/65.2 X |
| 4,405,029 | 9/1983 | Hunt | 180/65.2 |
| 5,120,282 | 6/1992 | Fjällström | 475/5 |
| 5,327,987 | 7/1994 | Abdelmalek | 180/65.2 |
| 5,346,031 | 9/1994 | Gardner | 180/65.2 X |

Primary Examiner—Charles A. Marmor
Assistant Examiner—Peter Kwon
Attorney, Agent, or Firm—Bacon & Thomas

[57] ABSTRACT

A drive side power unit, which may include the rotational output shaft of an internal combustion engine, drives a front section load, and is also coupled to a differential drive device made up of an electrical machine and a rear differential gear box. The electrical machine is coupled, via a transmission gear, to two differential output shafts and an input shaft, while the two wheel shafts of the differential gears are respectively coupled with a transmission middle shaft driven by the drive side rotational power unit and with the input shaft of the rear differential gear box through a clutch so as to drive a rear section load. Alternatively, the three end shaft differential gear system can be replaced by a planetary gear train and the transmission gear can be replaced by a friction wheel. A brake installed between the rotor and stator of the electrical machine can be controlled to generate motor driving functions when an input current is applied or to generate variable speed coupling functions through an output current when the electrical machine is employed as a generator. The engine can be operated at constant speed or at a partially adjustable speed to maximize engine efficiency and reduce pollution, with one part of the differential speed output power generated throughout the differential mixing drive device being used for driving the load while the remainder of the power is converted through the generator function of the electrical machine to charge the battery and thereby increase energy efficiency.

23 Claims, 8 Drawing Sheets

DISTRIBUTED DIFFERENTIAL MIXING COMBINED POWER SYSTEM

SUMMARY OF THE INVENTION

The distributed differential mixing combined power system is used in driving the traffic machinery such as vehicles, ships, flying machines or other mechanical structures (or other industrial or process equipment) in rotational driving applications, wherein it is chiefly comprised of that the rotational output shaft of the internal combustion engine (or other rotational power sources) is not only used to drive the front section load directly or through the transmission devices such as the transmission gears, belt or chain or the couplers, but is also coupled with the input shaft of the differential mixing drive unit to drive the rear section load. The said differential mixing drive device is comprised of an electrical machine combined with a three-end shaft differential wheels transmission system which is embodied in a three-end shaft differential gears structure, wherein the two differential output shaft and a input shaft are coupled with the electrical device through a transmission gear, while the two wheel shafts of the differential gears are respectively coupled with the transmission middle shaft driven by the drive side rotational power unit and are coupled with the input shaft of the rear differential gear box through a clutch to drive the two side differential acting rear section load; wherein the above said three-end shaft differential gears system can be substituted by a planetary gear train and the transmission gear can be substituted by a friction wheel; further, a brake is installed between the rotor and the stator of the electrical machine and the said brake is controlled by the operating device to generate motor driving functions when the input current is applied or to generate the variable speed coupling functions through the output current when it is employed as a generator, or to be used for starting the engine and the power regeneration brake which is particularly for case when the engine is the main transmission power source to charge the battery through the electrical machine of the differential mixing drive device, wherein the speed difference with the rear load section can be adjusted by controlling the charging current. The said engine can be at a constant speed or at a partially adjustable speed thereby to maintain at a working speed of higher operating efficiency and lower pollution and one part of the differential speed output power generated through the differential mixing drive device is used for driving the load while the rest part of the power is converted through the generator function of the electrical machine of the differential mixing drive device to charge the battery, thereby to promote the engine efficiency in the variable speed driving at the low driving speed range, to acquire the charging power to the battery while reducing the pollution, and to provide the variable speed coupling. Besides, it can also be used as a driving motor to generate rotational output to drive the load independently or to drive the load with the engine together.

DETAILED DESCRIPTION OF THE INVENTION

Figure 1:
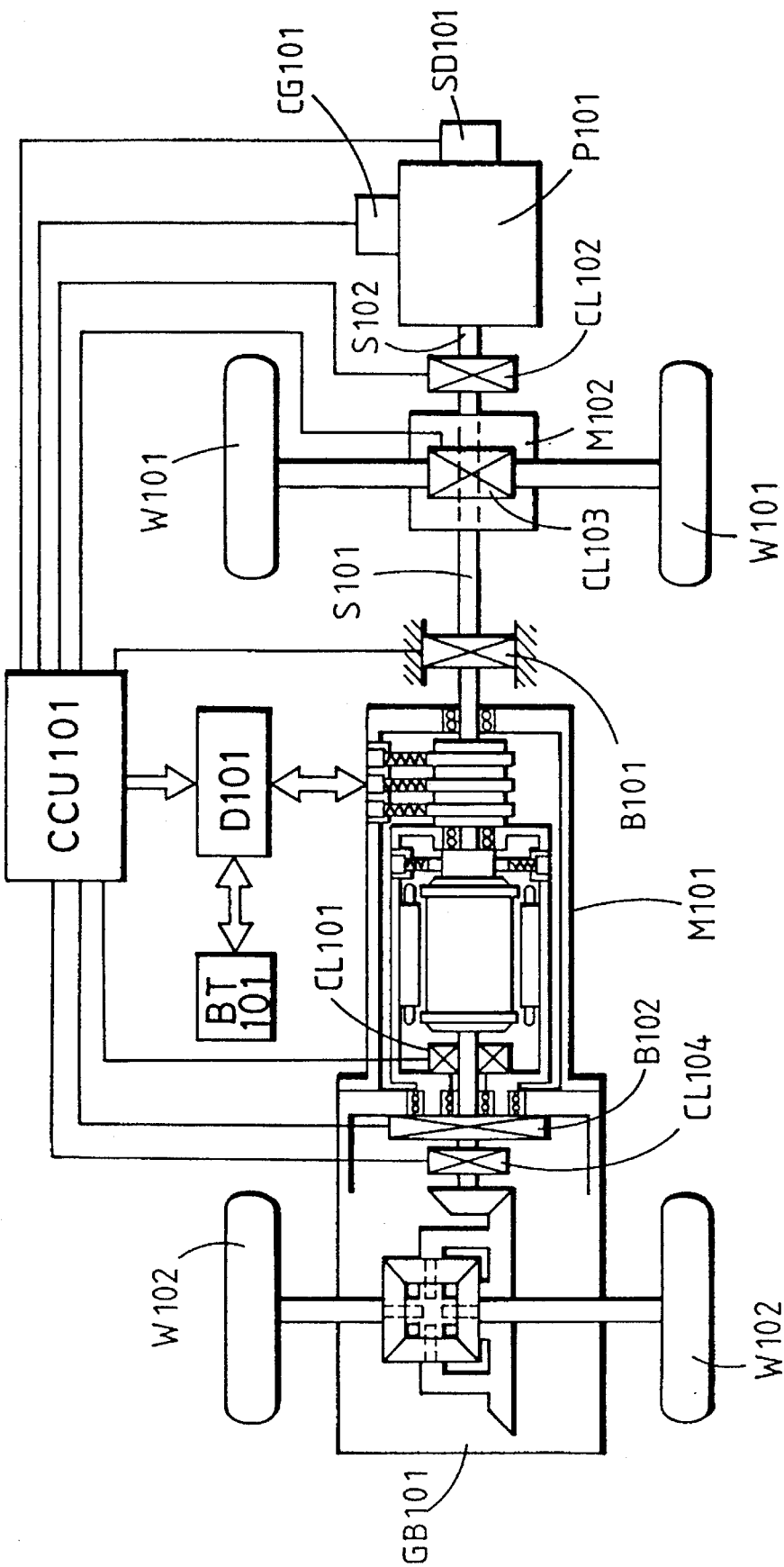
FIG. 1 is a embodying example of the invention

In recent years, the energy and noise pollution issues are becoming more and more serious, and a better solution to alleviate the problems is to use the electrical power driven carriers. However, the R&D of the electrical power driven carriers up to now is limited by the capacity of the batteries to achieve a larger moving range, while to increase the battery volume or the quantities will correspondingly increase the self-weight of the carrier resulting in consuming more electrical energy and does not meet the economic requirements. Therefore, before there us a big breakthrough in solving the battery technical problems, the more practical driving method is to use the combined driving structure designs, wherein the developed ones include:

(A) Series Combined Power design: This design is the most typical structure for the electrical driven vehicle, wherein the generator is driven by the engine to generate electricity and charge the battery, then the battery provides electricity to the driven motor to drive the vehicle. As the energy is converted several times, the overall efficiency of this design is low, such as the GM HX3 of General Motors.

(B) Synchronized Power on common shaft design: It is by directly series combining the engine power output shaft and the rotating shaft of the driven motor, thereby to generate driving and speed controlling functions, such as the West Germany sedan VW CHICO For the case of the engine or the motor described in (B), only one of them can be selected for output transmission and the combination of their power output is not available.

The disclosed distributed differential mixing combined power system of the invention is characterized that the output power from the output shaft of the engine (or other rotational power source) is not only used to drive the front section load, but is also combined with a differential mixing drive device to drive the rear section load, wherein the electrical machine of the said differential mixing drive device is constituted by an AC or DC, brushed or brushless electric machine combined with the three-end shaft differential wheels transmission system which is embodied in a three-end shaft differential gears structure, wherein the two differential output shaft and a input shaft are coupled with the electrical device through a transmission gear, while the two wheel shafts of the differential gears are respectively coupled with the transmission middle shaft driven by the drive side rotational power unit and are coupled with the input shaft of the rear differential gear box through a clutch to drive the two side differential acting rear section load; wherein the above said three-end shaft differential gears system can be substituted by a planetary gear train and the transmission gear can be substituted by a friction wheel; further, a brake is installed between the rotor and the stator of the electrical machine and the said brake is controlled by the operating device to generate motor functions when the input current is applied or to generate the generator output functions pulled by the external force. This design can add up the power and speed of the engine output to the rear load section and the output generated by the electrical machine itself while the adding process is not affected by the speed relationship between the two; and in general, it has a smaller system volume and saves the cost and space. The said electrical machine can be controlled by the operating device to generate motor driving functions when the input current is applied to drive the front section load or the rear section load, or to drive them simultaneously, or to start the engine, or to provide the generator output due to the rotation speed difference between the engine rotational power input and the driven load and to provide the differential adjusting function for the controllable speed change through the coupling torque generated by the output current, or to be used as the power regeneration brake which is particularly for case when the engine is the main-transmission power source to charge the battery through the speed difference between the two differential shafts of the three-end shaft differential gears system in the differential mixing drive device structure, wherein the speed difference with the rear load section can be adjusted by controlling the charging current. The said engine can be at a constant speed or at a partially adjustable speed thereby to maintain at a working speed of higher operating efficiency and lower pollution and one part of the differential speed output power generated through the differential mixing drive device is used for driving the load while the rest part of the power is converted through the generator function of the electromagnetic coupling device to charge the battery, thereby to promote the engine efficiency in the variable speed driving at the low driving speed range, to acquire the charging power to the battery while reducing the pollution, and to provide the variable speed coupling. Besides, it can also be used as a driving motor to generate rotational output to drive the load independently or to drive the load with the engine together.

The invention is illustrated according to the embodying examples shown in the enclosed drawings as follows:

FIG. 1 is the embodying example of the distributed differential mixing combined power system, which is characterized in:

A drive side rotational power source P101, wherein its output is first supplied to control the front section load and is then transmitted to the input end of the differential mixing drive device M101 to drive the rear section load.

A differential mixing drive device M101, wherein the transmission methods of its output end and its rear end include the direct transmission to another load (or through a transmission component to another load), or transmission to the differential acting load through the rear differential wheels train (such as the vehicle side rear wheels),and it is mainly comprised of the following:

A drive side rotational power unit P101: It is an internal engine or other power source, wherein the rotational output shaft S102 is coupled to the middle transmission device and the control interface M102 through the clutch CL102, and the said internal engine is further installed with a speed sensor SD101 to transmit the engine rotation signal to the central controller CCU101, wherein the controllable fuel valve CG101 is controlled by the said central controller CCU101 to change the engine speed or to keep the engine maintained at a constant speed;

A middle transmission device and a control interface M102 which is comprised of the automatic or manual speed change control system in the conventional front wheel drived system to drive the front section load only or to drive the whole loads: the clutch CL103 is installed between the middle input shaft S101 and the front section load to provide the transmission coupling or to cut off the transmission relationship between the middle transmission device and the front wheels, and the said clutch CL103 can also be substituted by the neutral shift or co-installed with the neutral shift when the shift interface is at the neutral shift status. The said middle shaft S101 is coupled at the output end of the clutch CL102 is either directly rear extended or through a transmission device to render the rotation speeds between the middle shaft S101 and the output presented in a constant speed ratio or a non-constant speed ratio (it is similar to the rear extended rear wheel transmission shaft in the four wheel drive), A brake B101 controlled by the central controller CCU101 is further installed between the middle shaft S101 and the fixed casing;

A direct driven front section load W101: It is comprised of one or more than one driven wheels with driven resistance of the load;

A differential mixing drive device M101: It is comprised of an electric machine U101 combined with the three-end shaft differential wheels transmission system which is embodied in a three-end shaft differential gears structure, wherein the two differential output shaft and a input shaft are coupled with the electrical device U101 through a transmission gear, while the two wheel shafts of the differential gears are respectively coupled with the transmission middle shaft S101 drived by the drive side rotational power unit and are coupled with the input shaft of the rear differential gear box GB101 through a clutch CL104 to drive the two side differential acting rear section load W102; wherein the above said three-end shaft differential gears system can be substituted by a planetary gear train and the transmission gear can be substituted by a friction wheel;

An electrical machine U101: Wherein between its rotor and its stator, a brake B103 is installed to be controlled by the central controller CCU101 to make a direct mechanical synchronous interlock on the rotor and stator of the electrical machine U101, wherein the above said electrical machine U101 is comprised of an AC or DC, brushed or brushless electrical machine structure, and is particularly suitable to be constituted by a series excited or auxiliary compound excited electrical machine with the electrical characteristic of rotational speed increased corresponding to the decreasing load, or an AC or DC brush or brushless machine able to perform current control (including constant current control) through the operating control of the drive circuit D101 to help provide the additional torque on the driven load;

A drive circuit device D101 which is installed between the electrical machine U101 and the battery BT101, wherein it receives the operating commands from the central controller CCU101 to control the electrical machine U101 functioned as a generator to charge the battery or supply power to the other load or to provide a current controllable generation output;

A central controller CCU101 which follows the commands from the operator and the operating status of the drive side rotational power unit P101 to generate the corresponding control commands to the drive circuit device D101;

A brake B102 can be installed as needed between the casing and the jointing side of the clutch CL104 which is located between the differential acting output shaft of the differential mixing drive device M101 and the coupled rear differential gear box, thereby to drive the front section load or to start the engine, or to provide power generation at standstill, wherein the electrical machine U101 is driven by the engine to function as a generator to charge the battery or supply power to the other loads. For the case of AC power generation output functions, the said U101 is selected to employee the electrical machine with AC power generating functions comprised of a permanent magnet or winding excited, varied frequency driven field type electrical device, or a brushed alternator type electrical device, wherein its armature winding is commonly installed the conducting rings for AC output and the commutators for DC input/ output, whereby the AC output can be a varied frequency output or a constant frequency output through the engine constant speed control;

The afore said direct driven load and the distributed differential load are comprised of one or more than one rotational power sources, or one or more than one direct driven load, or one or more than one differential mixing drive device M101 and its driven load groups in sequential series combinations of an enlarged type compound series combined structure.

Functions of the embodying example shown in FIG. 1 as is delineated in Table 1 as follows:

F1-A F1-B F1-C F1-D: They are the various system operations when the engine drives the load at low speed output;

F2 and F3: They are the system operations when the electrical machine U101 is powered by the battery to drive the load as a motor;

F4-A and F4-B: They are the system operations when the electrical machine U101 is powered by the battery to be operated as a motor and is driving the load with the engine together, thereby to have large power output through the output power addition;

F5, F6 and F7: They are the system operations when the electrical machine U101 is operated as a generator driven by the feedback mechanical energy of the load to charge the battery or to function as a brake by utilizing the friction damping of the engine itself;

F8: It is the system operation when the electrical machine U101 is driven by the engine to operated as a generator to charge the battery: This function can be further included with a charging timing control to stop automatically at a preset time. For the case of AC power generation output functions, the said U101 is selected to employee the electrical machine with AC power generating functions comprised of a permanent magnet or winding excited, varied frequency driven field type electrical device, or a brushed alternator type electrical device, wherein its armature winding is commonly installed the conducting rings for AC output and the commutators for DC input/output, whereby the AC output can be a varied frequency output or a constant frequency output through the engine constant speed control;

F9: The electrical machine U101 is operated as a motor and is powered by the battery to start the engine;

F10: The neutral sliding is that all the system clutches and brakes are at "OFF" state to provide low loss sliding operation;

The above system operating functions are described as follows:

F1-A: The engine fuel valve is controlled to drive the engine from low speed to high speed which is comprised of the following:

The internal engine is the drive side rotational power source which is controlled by the engine fuel valve to drive the rear section load, wherein the clutches CL102 and CL104 are at ON state while the CL103 is at OFF state and the brakes B101 and B102 are at OFF state while the B103 is at the ON state.

The internal engine is the drive side rotational power source which is controlled by the engine fuel valve to drive the front and rear section loads, wherein the clutches CL102, CL103 and CL104 are all at ON state and the brakes B101 and B102 are at OFF state, while the brake B103 is at the ON state;

The internal engine is the drive side rotational power source which is controlled by the engine fuel valve to drive the front section load, wherein the clutches CL102 and CL103 are at ON state while the CL104 are at OFF state and the brakes B101, B102, B103 are all at the OFF state;

F1-B: The engine fuel vale and the electrical machine U101 is controlled simultaneously to drive the engine from low speed to high speed and to charge the battery simultaneously, which is comprised of the following:

The internal engine is the drive side rotational power source which is controlled by the engine fuel valve on the engine speed change and to operate the electrical machine U101 as a generator to charge the battery and to drive the rear section load, wherein the clutch CL103 is at OFF state while the CL102 and CL104 are at ON state and the brakes B101, B102 and B103 are all at OFF state;

The internal engine is the drive side rotational power source which is controlled by the engine fuel valve on the engine speed change and to operate the electrical machine U101 as a generator to charge the battery and to drive the front and rear section loads together with the engine, wherein the clutches CL102, CL103 and CL104 are at ON state and the brakes B101, B102 and B103 are all at OFF state;

The internal engine is the drive side rotational power source which is controlled by the engine fuel valve on the engine speed change and to drive the front section load as well as to operate the electrical machine U101 as a generator to charge the battery at the same time, wherein the clutch CL104 is at OFF state while the CL102 and CL103 are at ON state; Further, the brakes B101 and B103 are OFF while the B102 is at ON state;

F1-C: The engine is speed controlled or operated at a constant speed, wherein the battery charging current from the electrical machine U101 is controlled to change the output power to the load and it is comprised of the following:

The internal engine is the drive side rotational power source, wherein the engine is controlled by the engine fuel valve and the speed feedback signal to operate at constant speed as well as to operate the electrical machine U101 to charge the battery, thereby to adjust the coupling torque to drive the rear section load, wherein the clutches CL103 is at OFF state while the CL102 and CL104 are at ON state and the brakes B101, B102 and B103 are at OFF state;

The internal engine is the drive side rotational power source, wherein the engine speed is controlled by the engine fuel valve and the speed feedback signal to drive the front section load as well as to operate the electrical machine U101 to charge the battery, thereby to adjust the coupling torque to drive the rear section load, wherein the clutches the CL102, CL103 and CL104 are at ON state and the brakes B101, B102 and B103 are at OFF state;

F1-D: The electrical machine U101 generates short cut current to control the output-shaft torque, thereby to change the engine speed and is comprised of the following:

The internal engine is the drive side rotational power source, wherein the engine fuel valve and the speed feedback signal are utilized to control the engine speed and simultaneously to operate the electrical machine U101 as a generator and control on the generated short cut circuit current to change its coupled torque, thereby to change the transmission power to the front and rear section loads, wherein the clutch CL103 is at OFF state, while the CL102 and CL104 are at ON state and the brakes B101, B102 and B103 are at OFF state;

The internal engine is the drive side rotational power source, wherein the engine fuel valve and the speed feedback signal are utilized to control the engine speed and simultaneously to operate the electrical machine U101 as a generator and control on the generated short cut circuit current to change its coupled torque, thereby to change the transmission power to the front and rear section loads, wherein the CL102, CL103 and CL104 are at ON state and the brakes B101 and B102 are at OFF state;

F2: The electrical machine U101 is powered by the battery to change the speed or the rotation direction of the rear section load, which is comprised of the following:

The electrical machine U101 is powered by the battery to drive the rear section load: At this time, the said electrical machine U101 is operated as a motor and the brake 101 is at ON state while the brake B102 and B103 are at OFF state. The clutch CL102 and the clutch CL103 for controlling the front section load are at OFF state, and the CL104 is at ON state;

F3: The electrical machine U101 is powered by the battery to change the speed or the rotation direction of the front section load, which is comprised of the following:

The electrical machine U101 is powered by the battery to drive the front section load: At this time, the electrical machine U101 is operated as a motor while the brake B102 is at the ON state and the B101 and B103 are at OFF state, the clutches CL102 and CL104 are at OFF state, and the CL103 is at ON state;

F4-A: The engine is operated at a preset speed while the electrical machine U101 is operated as a motor to provide added power output to drive the rear section load, which is comprised of the following:

The internal engine is the drive side rotational power source, wherein the engine is operated at a varied or constant speed and the electrical machine U101 is powered by the battery at the same time, thereby to provide the added power output to drive the rear section load simultaneously. At this time, the clutch CL103 is at OFF state while the CL102 and CL104 are at ON state and the brakes B101, B102 and B103 are all at OFF state;

F4-B: The engine is operated at a preset speed while the electrical machine U101 is operated as a motor to provide added power output to drive the front and rear section loads, which is comprised of the following:

The internal engine is the drive side rotational power source, wherein the engine is operated at a varied or constant speed and the electrical machine U101 is powered by the battery at the same time, thereby to provide the added power output to drive the front and rear section loads simultaneously. At this time, the CL102, CL103 and CL104 are at ON state and the brakes B101, B102 and B103 are at OFF state;

F5: The electrical machine U101 is operated as a generator to charge the battery using the recovered rear section kinetic energy, which is comprised of the following:

The engine speed is reduced or the fuel valve is closed and the electrical machine U101 is operated as a generator to covert the rotational mechanical energy of the rear section load into the electric power to charge the battery, or to consume the electric power by the other loads, thereby to obtain the friction damping and together with the engine piston friction damping to constitute the braking friction damping, wherein the brakes B101, B102 and B103 are at OFF state, the clutch CL103 is at OFF state, the CL102 and CL104 are at ON state, and the engine can be stopped or slowly operated;

The electrical machine U101 is operated as a generator to covert the rotational mechanical energy of the rear section load into the electric power to charge the battery, or to consume the electric power by the other loads, thereby to obtain the friction damping, wherein the brake B101 is at ON state while the B102 and B103 are at OFF state, and the clutches CL102 and CL103 are at OFF state, and the engine can be stopped or operated at a slower speed than the sliding speed, and when the CL104 is at ON state, the engine can be at operating or stop;

F6: The electrical machine U101 is operated as a generator to charge the battery using the recovered front section kinetic energy, which is comprised of the following:

The engine speed is reduced or the fuel valve is closed and the electrical machine U101 is operated as a generator to covert the rotational mechanical energy of the front section load into the electric power to charge the battery, or to consume the electric power by the other loads, thereby to obtain the friction damping and together with the engine piston friction damping to constitute the braking friction damping, wherein the brakes B101 and B103 are at OFF state, while the B102 is at ON state, and the clutch CL104 is at OFF state, while the CL102 and CL103 are at ON state, and the engine can be stopped or slowly operated;

The electrical machine U101 is operated as a generator to covert the rotational mechanical energy of the front section load into the electric power to charge the battery, or to consume the electric power by the other loads, thereby to obtain the friction damping, wherein the brake B102 is at ON state, and the B101 and B103 are at OFF state, the clutches CL102 and CL104 are at OFF state, while the CL103 is at ON state and the engine can be stopped or operated at a slower speed than the sliding speed, and when the CL102 is at OFF state, the engine can be at operating state or stopped;

F7: All the loads are braked by the engine friction damping, which is comprised of the following:

The engine speed is reduced or the fuel valve is closed and the generator is operated to covert the rotational mechanical energy of the front and rear section loads into the friction damping and together with the engine piston friction damping to constitute the braking friction damping, wherein the brake B101, B102 and B103 are at OFF state, the clutches the CL102, CL103 and CL104 are at ON state, and the engine can be stopped or slowly operated;

F8: The system is self charged, which is comprised of the following:

The electrical machine U101 is drived by the drive side rotational power source to be operated as a generator to charge the battery or supply power to the other loads. At this time when the engine is started, the brakes B101 and B103 are at OFF state, while the B102 is at ON state, and the clutches CL103 and CL104 are at OFF state, while the CL102 is at ON state; and the timer can be further utilized to preset the engine charging time or control the charging capacity for automatic stop. For the case of AC power output function, the said U101 is selected to employee the electrical machine with AC power generating functions comprised of a permanent magnet or winding excited, varied frequency driven field type electrical device, or a brushed alternator type electrical device, wherein its armature winding is commonly installed the conducting rings for AC output and the commutators for DC input/output, wherein the AC output can be provided at a varied frequency or a constant frequency through the engine constant speed control;

F9: The electrical machine U101 is operated as a motor to start the engine, which is comprised of the following:

The electrical machine U101 is used to start the drive side engine: At this time, the brake B102 is at ON state, while the B101 and B103 is at OFF state, and the front section operating interface M102 and the front section coupled clutches CL103 and CL104 are at OFF state, while the Clutch CL102 is at ON state;

F10: Neutral slide: It is the slide function of the system when no power output and brake are activated, which is comprised of the following:

The engine can be at operating state or stopped, the brake B101, B102 and B103 are at OFF state, the clutches CL102, CL103 and CL104 are all at OFF state.

Figure 2:
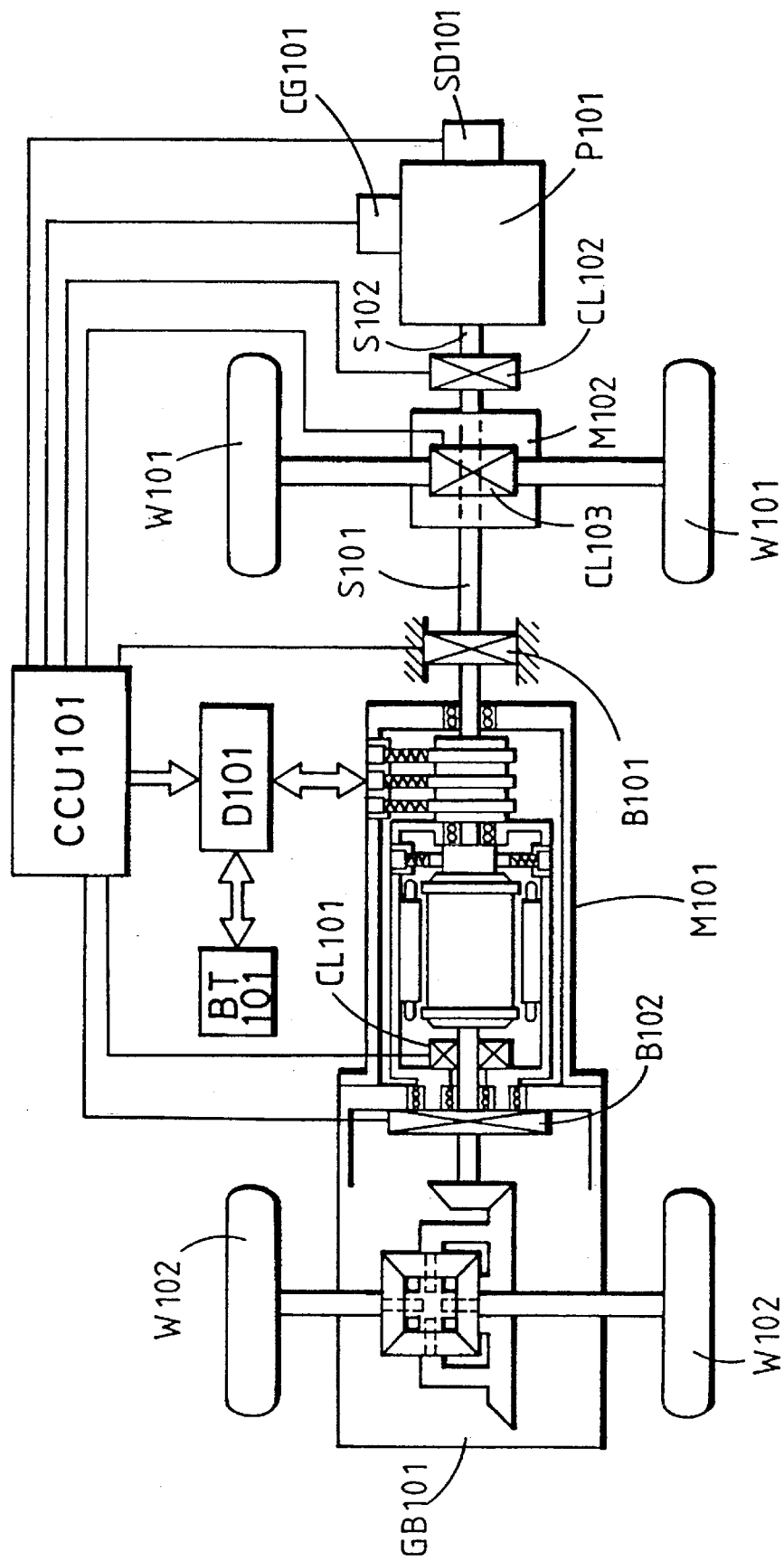
FIG. 2 is the first application system of FIG. 1

The embodying example of the distributed differential mixing combined power system in FIG. 1 are comprised of the following variations in the practical applications:

FIG. 2 is the first application system of FIG. 1: It discloses the application example of eliminating the clutch CL104, and the system functions are delineated in Table 2.

Figure 3:
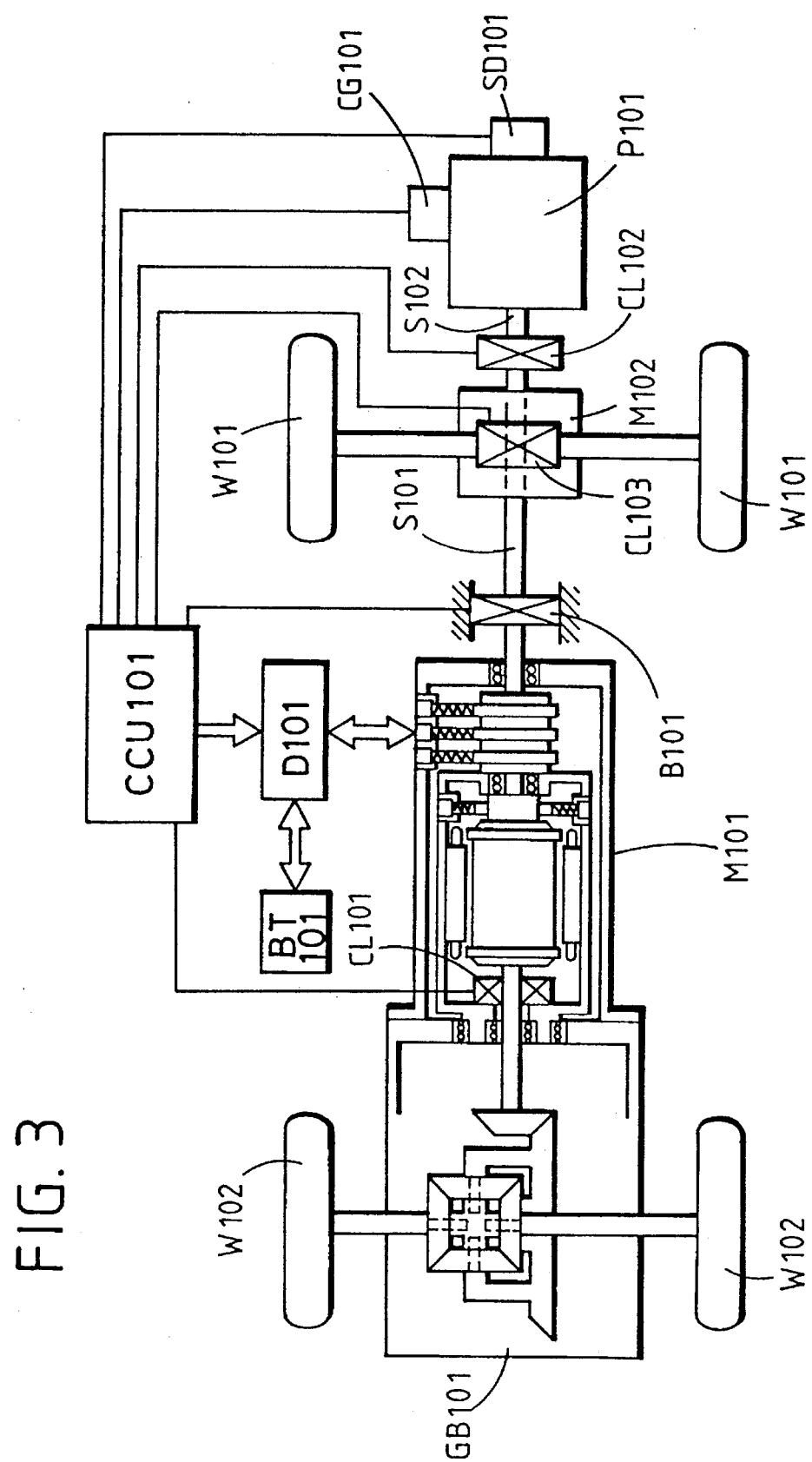
FIG. 3 is the second application system of FIG. 1

FIG. 3 is the second application system of FIG. 1: It discloses the application example of eliminating the clutch CL104 and the brake B102, and the system functions are delineated in Table 3.

Figure 4:
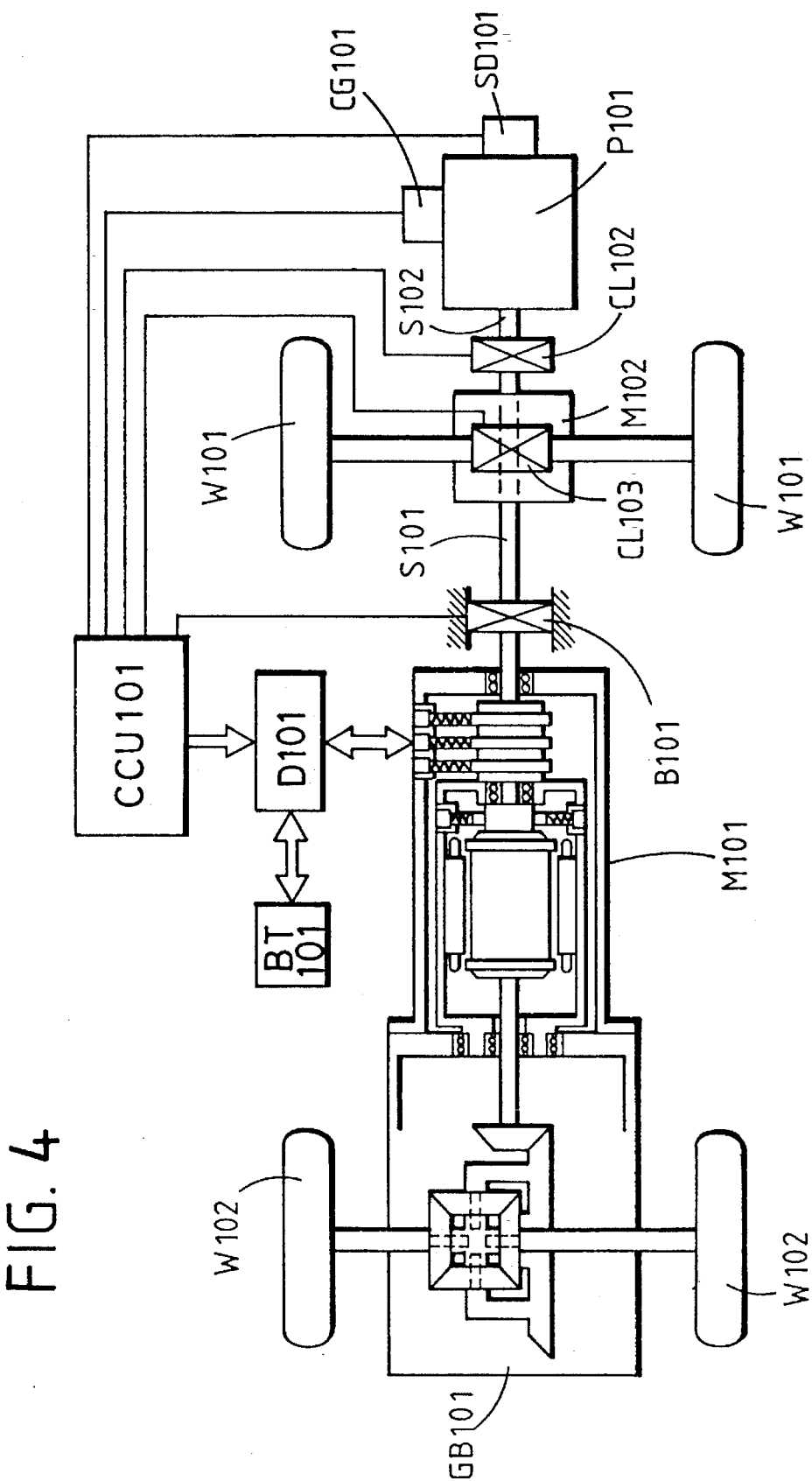
FIG. 4 is the third application system of FIG. 1

FIG. 4 is the third application system of FIG. 1: It discloses the application example of eliminating the B102, B103 and CL104, and the system functions are delineated in Table 4.

Figure 5:
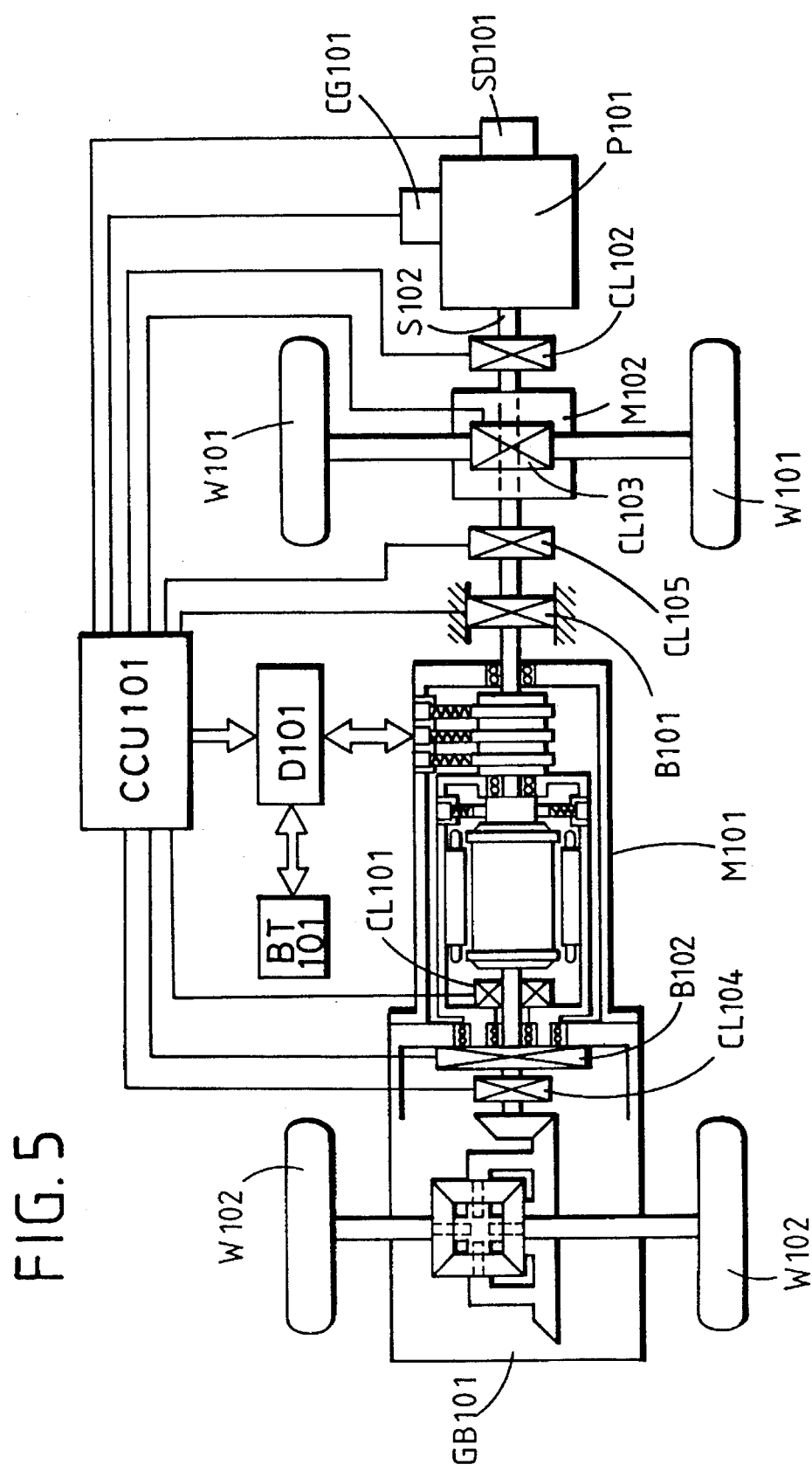
FIG. 5 is the fourth application system of FIG. 1

FIG. 5 is the fourth application system of FIG. 1: It discloses the application example of further installing the clutch CL105 between rear section output middle shaft and middle transmission device while the clutch CL103 for controlling the front section load is reserved (or the said clutch is replaced by the speed change shift of the middle transmission device), and the system functions are delineated in Table 5, wherein besides of the functions delineated in Table 1, the additional functions are described as follows:

F11: The engine is used to drive the front section load, and the electrical machine U101 is powered by the battery to drive the rear section load, and both are independently operated to drive the respective loads, wherein the brake B101 is at ON state, while the B102 and B103 are at OFF state, and the clutch CL105 is at OFF state, while the CL102, CL103 and CL104 are at ON state;

F12: The engine is used to drive the front section load and the electrical machine U101 is pulled to be operated as a generator to charge the battery, wherein the brake B101 is at ON state, while the B102 and B103 are at OFF state, and the clutch CL105 is at OFF state, while the CL102, CL103 and CL104 are at ON state.

Figure 6:
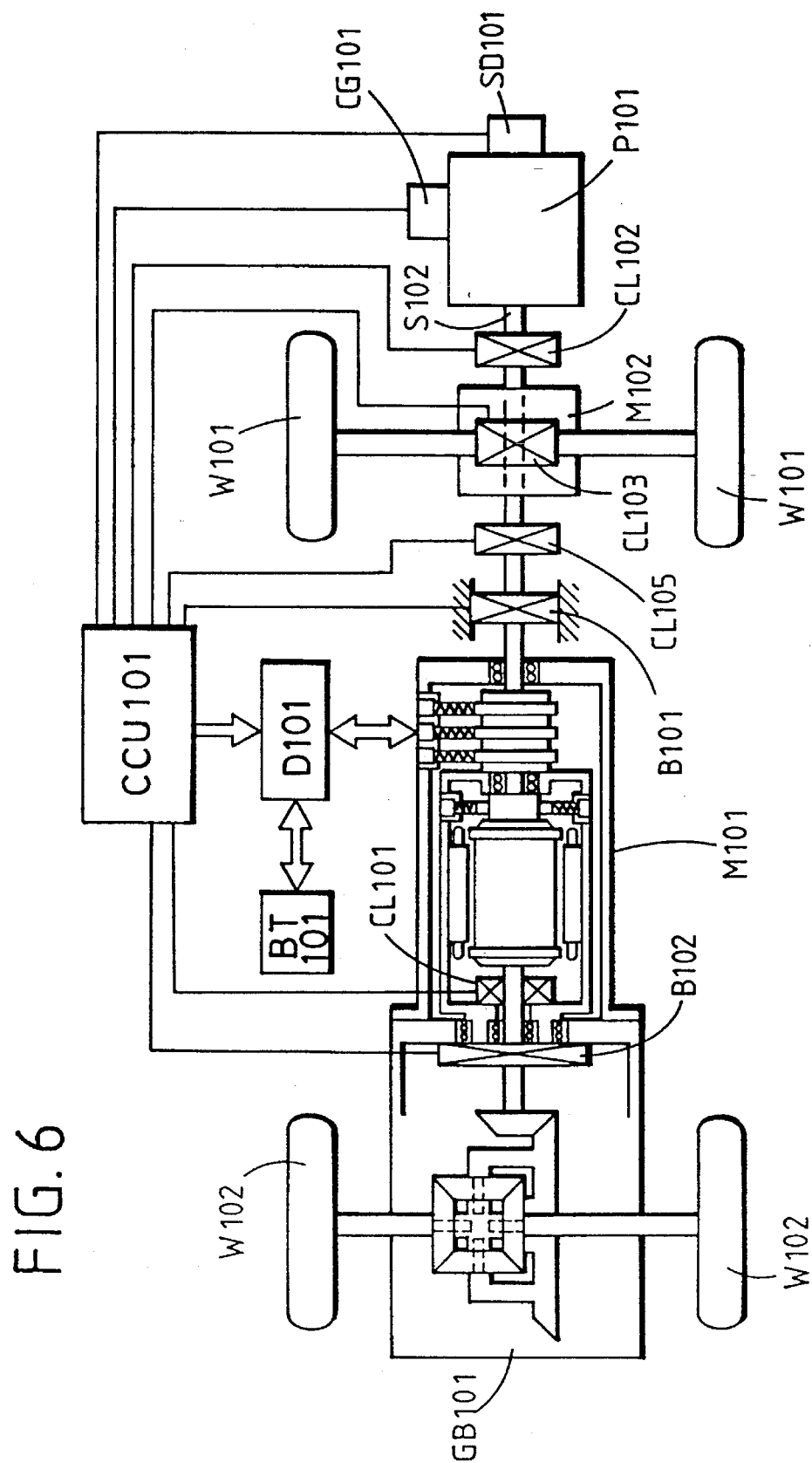
FIG. 6 is the fifth application system of FIG. 1

FIG. 6 is the fifth application system of FIG. 1: It discloses the application example of further installing the clutch CL105 between the rear section output middle shaft and the middle transmission device and eliminating the clutch CL104, and the system functions are delineated in Table 6.

Figure 7:
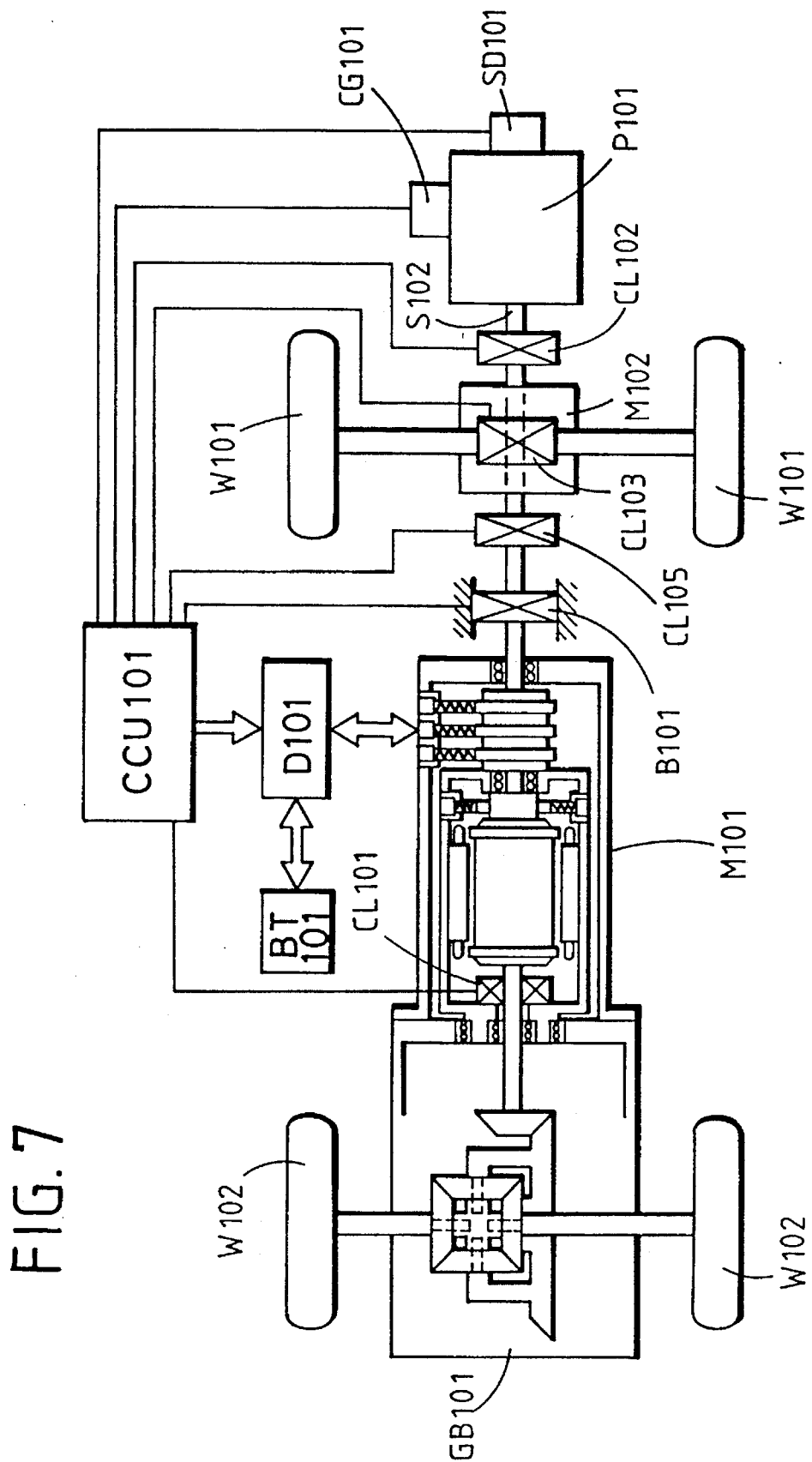
FIG. 7 is the sixth application system of FIG. 1

FIG. 7 is the sixth application system of FIG. 1: It discloses the application example of further installing the clutch CL105 between the rear section output middle shaft and the middle transmission device and eliminating the clutch CL104 and brake B102, and the system functions are delineated in Table 7.

Figure 8:
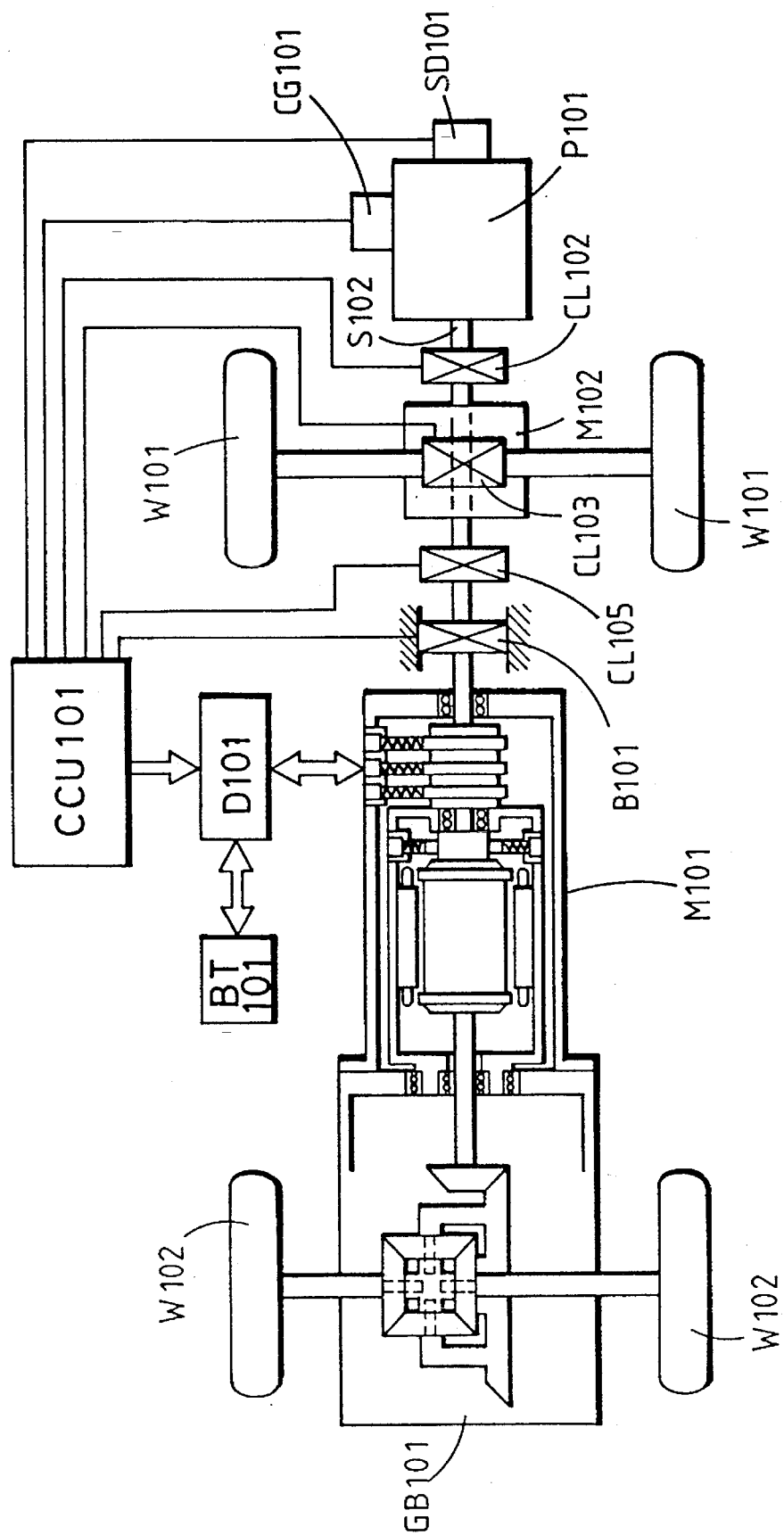
FIG. 8 is the seventh application system of FIG. 1

FIG. 8 is the seventh application system of FIG. 1: It discloses the application example of further installing the clutch CL105 and eliminating the clutch CL104 and brakes B102 and B103, and the system functions are delineated in Table 8.

The above described application examples are for reference only, wherein the practical applications can be achieved by rendering the front and the rear section loads constituted in a distributed differential mixing structure of the combined driving characteristics on the loads according to the performance requirements without changing the design of this invention to select the corresponding operating and control components.

For the case when the systems of the embodying examples in FIG. 1~8 are applied on the carriers, the angle displacement relationships between the front and rear section loads and the drive power source resulted from the transmission ratio and the wheel outside diameter differences include: The angle displacement speed of the two loads and the drive side rotational power source are operated according to the wheel system ratio relationships, or the angle displacement relationship between the two loads and their operations with the drive side rotational power source are not according to the wheel system ratio (such as slipping on the road surface), particularly, the relationships between the angle displacement of the rear section load and the drive side power source or between the front and rear section loads can be specially set not to operate according to the wheel system ratio relationship, but to operate through the differential acting adjustment by the electrical machine U101;

The differential acting adjustment of the electrical machine U101 includes the active adjustment through input power to function as a motor or the passive adjustment through functioning as a generator to output power;

In the carrier driving applications of the afore said front section load and the rear section load, the front section load can be the front wheel or the rear wheel, the rear section-load can be the matched front wheel or rear wheel structure with the afore said definition;

The distributed differential mixing combined power system has numerous operating functions in the section differential driving characteristic structure, therefore in the practical applications, it can be embodied to be comprised of all the functions or part of the functions.

As summarized from the above descriptions, the distributed differential mixing combined power system can be applied at vehicles, boats or utilized as other fixed combined driving power. The afore said embodying examples disclose the various application modes of the distributed differential mixing combined power system of the invention and in practical applications, the peripheral components for the output functions can be selected according to needs, thereby to flexibly select the required system.

TABLE 1

| | | COMPONENTS | |
|---|---|---|---|
| FUNCTIONS | B101 | P101 | CL102 |
| F1-A  The engine fuel valve is controlled to drive the engine from low speed to high speed | OFF | 0-MAX | ON |

TABLE 1-continued

| | | | | |
|---|---|---|---|---|
| F1-B | The engine fuel vale and the U101 is controlled simultaneously to drive the engine from low speed to high speed and to charge the battery simultaneously | OFF | 0-MAX | ON |
| F1-C | The engine is speed controlled or operated at a constant speed, wherein the battery charging current from the U101 is controlled to change the output power to the load; | OFF | *0-MAX OR CONSTANT SPEED **0-MAX | ON |
| F1-D | The engine is speed controlled or operated at a constant speed, wherein the U101 generates short cut current to control the output shaft torque, thereby to change the engine speed | OFF | *0-MAX OR CONSTANT SPEED **0-MAX | ON |
| F2 | The U101 is powered by the battery to change the speed or the rotation direction of the rear section load | ON | STOP | OFF |
| F4-A | The engine is operated at a preset speed while the U101 is operated as a motor to provide added power output to drive the rear section load | OFF | 0-MAX OR CONSTANT SPEED | ON |
| F4-B | The engine is operated at a preset speed while the U101 is operated as a motor to provide added power output to drive the front and rear section loads | OFF | 0-MAX CONSTANT SPEED | ON |
| F5 | The U101 is operated as a generator to charge the battery using the recovered rear section kinetic energy | *OFF **ON | *SLOW OR STOP **STOP-MAX | *ON **OFF |
| F6 | The U101 is operated as a generator to charge the battery using the recovered front section kinetic energy | OFF | *SLOW OR STOP **STOP-MAX | *ON **OFF |
| F7 | All the loads are braked by the engine friction damping | OFF | SLOW OR STOP | ON |
| F8 | The system is self charged (It can be stopped at a preset time or controlled by the capacity) through that the U101 is driven by the engine to be operated as a generator to charge th battery or to provide varied or constant frequency AC generation output | OFF | 0-MAX OR CONSTANT SPEED | ON |
| F9 | The U101 is operated as a motor to start the engine | OFF | STOP TO START | ON |
| F10 | Neutral Slide | OFF | STOP OR 0-MAX | OFF |

| | | COMPONENTS | | | |
|---|---|---|---|---|---|
| FUNCTIONS | | CL103 | G/M (U101) | BT101 | REMARK |
| F1-A | The engine fuel valve is controlled to drive the engine from low speed to high speed | *OFF **ON ***ON | *READY **READY ***READY | *READY **READY ***READY | *Drive the rear section load |
| F1-B | The engine fuel vale and the U101 is controlled simultaneously to drive the engine from low speed to high speed and to charge the battery simultaneously | *OFF **ON ***ON | GEN- | CHARGE | **Drive the front and rear section loads simultaneously ***Drive the front section load |
| F1-C | The engine is speed controlled or operated at a constant speed, wherein the battery charging current from the U101 is controlled to change the output power to the load; | *OFF **ON | GEN- | DIS-CHARGE | |
| F1-D | The engine is speed controlled or operated at a constant speed, wherein the U101 generates short cut current to control the output shaft torque, thereby to change the engine speed | *OFF **ON | GEN- | READY | |
| F2 | The U101 is powered by the battery to change the speed or the rotation direction of the rear section load | OFF | MOTOR | DIS-CHARGE | |
| F4-A | The engine is operated at a preset speed while the U101 is operated as a motor to provide added power output to drive the rear section load | OFF | MOTOR | DIS-CHARGE | |
| F4-B | The engine is operated at a preset speed while the U101 is operated as a motor to provide added power output to drive the front and rear section loads | ON | MOTOR | DIS-CHARGE | |
| F5 | The U101 is operated as a generator to charge the battery using the recovered rear section kinetic energy | OFF | GEN- | CHARGE | *The engine piston friction damping is activated simultaneously **Recovery of the kinetic energy |
| F6 | The U101 is operated as a generator to charge the battery using the recovered front section kinetic energy | ON | GEN- | CHARGE | |
| F7 | All the loads are braked by the engine friction damping | ON | READY | READY | |
| F8 | The system is self charged (It can be stopped at a preset time or controlled by the capacity) through that the U101 is driven by the engine to be operated as a generator to charge the battery or to provide varied or constant frequency AC generation output | OFF | GEN- | CHARGE | The operation is limited to when the the engine is stopped and the |
| F9 | The U101 is operated as a motor to start the engine | OFF | MOTOR | DIS-CHARGE | |

TABLE 1-continued

| | | | | | rear load brake is locked. |
|---|---|---|---|---|---|
| F10 | Neutral Slide | OFF | READY | READY | |

Notes:
1) CHARGE current of F1-B is load following distributed
2) The U101 is an electrical machine
3) BT101 is the battery
4) GEN- is a generator
5) For the case of engine, the P101 is the drive side rotational power source which is employed to drive the front section load and is series combined with the U101 to drive the rear section load
6) For the case of AC power output function in F8, the said U101 is selected to employee the electrical machine with AC power generating functions comprised of a permanent magnet or winding excited, varied frequency driven field type electrical device, or a brushed alternator type electrical device, wherein its armature winding is commonly installed the conducting rings for AC output and the commutators for DC input/output.

TABLE 2

| | | COMPONENTS | | | | |
|---|---|---|---|---|---|---|
| FUNCTIONS | | B101 | B102 | P101 | B103 | CL102 |
| F1-A | The engine fuel valve is controlled to drive the engine from low speed to high speed | OFF | *OFF **OFF ***OFF | 0-MAX | *ON **ON ***OFF | ON |
| F1-B | The engine fuel vale and the U101 is controlled simultaneously to drive the engine from low speed to high speed and to charge the battery simultaneously | OFF | *OFF **OFF ***ON | 0-MAX | *OFF | ON |
| F1-C | The engine is speed controlled or operated at a constant speed, wherein the battery charging current from the U101 is controlled to change the output power to the load; | OFF | OFF | *0-MAX OR CONSTANT SPEED **0-MAX | OFF | ON |
| F1-D | The engine is speed controlled or operated at a constant speed, wherein the U101 generates short cut current to control the output shaft torque, thereby to change the engine speed | OFF | OFF | *0-MAX OR CONSTANT SPEED **0-MAX | OFF | ON |
| F2 | The U101 is powered by the battery to change the speed or the rotation direction of the rear section load | ON | OFF | STOP | OFF | OFF |
| F4-A | The engine is operated at a preset speed while the U101 is operated as a motor to provide added power output to drive the rear section load | OFF | OFF | 0-MAX OR CONSTANT SPEED | OFF | ON |
| F4-B | The engine is operated at a preset speed while the U101 is operated as a motor to provide added power output to drive the front and rear section loads | OFF | OFF | 0-MAX | OFF | ON |
| F5 | The U101 is operated as a generator to charge the battery using the recovered rear section kinetic energy | *OFF **ON | OFF | *SLOW OR STOP **STOP-MAX | OFF | *ON **OFF |
| F7 | All the loads are braked by the engine friction damping | OFF | OFF | SLOW OR STOP | OFF | ON |
| F8 | The system is self charged (It can be stopped at a preset time or controlled by the capacity) through that the U101 is dried by the engine to be operated as a generator to charge the battery or to provide varied or constant frequency AC generation output | OFF | ON | 0-MAX OR CONSTANT SPEED | OFF | ON |
| F9 | The U101 is operated as a motor to start the engine | OFF | ON | STOP TO START | OFF | ON |
| F10 | Neutral Slide | OFF | OFF | STOP OR 0-MAX | OFF | OFF |

| | | COMPONENTS | | | |
|---|---|---|---|---|---|
| FUNCTIONS | | CL103 | G/M (U101) | BT101 | REMARK |
| F1-A | The engine fuel valve is controlled to drive the engine from low speed to high speed | *OFF **ON ***ON | *READY **READY ***READY | *READY **READY ***READY | *Drive the rear section load |
| F1-B | The engine fuel vale and the U101 is controlled simultaneously to drive the engine from low speed to high speed and to charge the battery simultaneously | *OFF **ON ***ON | GEN- | CHARGE | **Drive the front and rear section loads simultaneously ***Drive the front section load |
| F1-C | The engine is speed controlled or operated at a constant speed, wherein the battery charging current from the U101 is controlled to change the output power to the load; | *OFF **ON | GEN- | DIS-CHARGE | |
| F1-D | The engine is speed controlled or operated at a constant speed, wherein the U101 generates short cut current to control the output shaft torque, thereby to change the engine speed | *OFF **ON | GEN- | READY | |
| F2 | The U101 is powered by the battery to change the speed or the rotation direction of the rear section load | OFF | MOTOR | DIS-CHARGE | |
| F4-A | The engine is operated at a preset speed while the U101 is operated as a motor to provide added power output to drive the rear section load | OFF | MOTOR | DIS-CHARGE | |
| F4-B | The engine is operated at a preset speed while the U101 is | ON | MOTOR | DIS- | |

TABLE 2-continued

|   | | | | | |
|---|---|---|---|---|---|
|   | | operated as a motor to provide added power output to drive the front and rear section loads | | | CHARGE | |
| F5 | | The U101 is operated as a generator to charge the battery using the recovered rear section kinetic energy | OFF | GEN- | CHARGE | *The engine piston friction damping is activated simultaneously **Recovery of the kinetic energy |
| F7 | | All the loads are braked by the engine friction damping | ON | READY | READY | |
| F8 | | The system is self charged (It can be stopped at a preset time or controlled by the capacity) through that the U101 is dried by the engine to be operated as a generator to charge the battery or to provide varied or constant frequency AC generation output | OFF | GEN- | CHARGE | The operation is limited to when the engine is stopped. |
| F9 | | The U101 is operated as a motor to start the engine | OFF | MOTOR | DISCHARGE | |
| F10 | | Neutral Slide | OFF | READY | READY | |

Notes:
1) CHARGE current of F1-B is load following distributed
2) The U101 is an electrical machine
3) BT101 is the battery
4) GEN- is a generator
5) For the case of engine, the P101 is the drive side rotational power source which is employed to drive the front section load and is series combined with the U101 to drive the rear section load
6) For the case of AC power output function in F8, the said U101 is selected to employee the electrical machine with AC power generating functions comprised of a permanent magnet or winding excited, varied frequency driven field type electrical device, or a brushed alternator type electrical device, wherein its armature winding is commonly installed the conducting rings for AC output and the commutators for DC input/output.

TABLE 3

|  |  | COMPONENTS | | | |
|---|---|---|---|---|---|
| FUNCTIONS | | B101 | P101 | B103 | CL102 |
| F1-A | The engine fuel valve is controlled to drive the engine from low speed to high speed | OFF | 0-MAX | *ON **ON ***OFF | ON |
| F1-B | The engine fuel vale and the U101 is controlled simultaneously to drive the engine from low speed to high speed and to charge the battery simultaneously | OFF | 0-MAX | *OFF | ON |
| F1-C | The engine is speed controlled or operated at a constant speed, wherein the battery charging current from the U101 is controlled to change the output power to the load; | OFF | *0-MAX OR CONSTANT SPEED **0-MAX | OFF | ON |
| F1-D | The engine is speed controlled or operated at a constant speed, wherein the U101 generates short cut current to control the output shaft torque, thereby to change the engine speed | OFF | *0-MAX OR CONSTANT SPEED **0-MAX | OFF | ON |
| F2 | The U101 is powered by the battery to change the speed or the rotation direction of the rear section load | ON | STOP | OFF | OFF |
| F4-A | The engine is operated at a preset speed while the U101 is operated as a motor to provide added power output to drive the rear section load | OFF | 0-MAX OR CONSTANT SPEED | OFF | ON |
| F4-B | The engine is operated at a preset speed while the U101 is operated as a motor to provide added power output to drive the front and rear section loads | OFF | 0-MAX | OFF | ON |
| F5 | The U101 is operated as a generator to charge the battery using the recovered rear section kinetic energy | *OFF **ON | *SLOW OR STOP **STOP-MAX | OFF | *ON **OFF |
| F7 | All the loads are braked by the engine friction damping | OFF | SLOW OR STOP | OFF | ON |
| F8 | The system is self charged (It can be stopped at a preset time or controlled by the capacity) through that the U101 is driven by the engine to be operated as a generator to charge the battery or to provide varied or constant frequency AC generation output | OFF | 0-MAX OR CONSTANT SPEED | OFF | ON |
| F9 | The U101 is operated as a motor to start the engine | OFF | STOP TO START | OFF | ON |
| F10 | Neutral Slide | OFF | STOP OR 0-MAX | OFF | OFF |

TABLE 3-continued

| | FUNCTIONS | | CL103 | G/M (U101) | BT101 | REMARK |
|---|---|---|---|---|---|---|
| F1-A | The engine fuel valve is controlled to drive the engine from low speed to high speed | | *OFF **ON ***ON | *READY **READY ***READY | *READY **READY ***READY | *Drive the rear section load |
| F1-B | The engine fuel vale and the U101 is controlled simultaneously to drive the engine from low speed to high speed and to charge the battery simultaneously | | *OFF **ON ***ON | GEN- | CHARGE | **Drive the front and rear section loads simultaneously ***Drive the front section load |
| F1-C | The engine is speed controlled or operated at a constant speed, wherein the battery charging current from the U101 is controlled to change the output power to the load; | | *OFF **ON | GEN- | DIS-CHARGE | |
| F1-D | The engine is speed controlled or operated at a constant speed, wherein the U101 generates short cut current to control the output shaft torque, thereby to change the engine speed | | *OFF **ON | GEN- | READY | |
| F2 | The U101 is powered by the battery to change the speed or the rotation direction of the rear section load | | OFF | MOTOR | DIS-CHARGE | |
| F4-A | The engine is operated at a preset speed while the U101 is operated as a motor to provide added power output to drive the rear section load | | OFF | MOTOR | DIS-CHARGE | |
| F4-B | The engine is operated at a preset speed while the U101 is operated as a motor to provide added power output to drive the front and rear section loads | | ON | MOTOR | DIS-CHARGE | |
| F5 | The U101 is operated as a generator to charge the battery using the recovered rear section kinetic energy | | OFF | GEN- | CHARGE | *The engine piston friction damping is activated simultaneously **Recovery of the kinetic energy |
| F7 | All the loads are braked by the engine friction damping | | ON | READY | READY | |
| F8 | The system is self charged (It can be stopped at a preset time or controlled by the capacity) through that the U101 is driven by the engine to be operated as a generator to charge the battery or to provide varied or constant frequency AC generation output | | OFF | GEN- | CHARGE | The operation is limited to when the engine is stopped and the rear load brake is locked. |
| F9 | The U101 is operated as a motor to start the engine | | OFF | MOTOR | DIS-CHARGE | |
| F10 | Neutral Slide | | OFF | READY | READY | |

Notes:
1) CHARGE current of F1-B is load following distributed
2) The U101 is an electrical machine
3) BT101 is the battery
4) GEN- is a generator
5) For the case of engine, the P101 is the drive side rotational power source which is employed to drive the front section load and is series combined with the U101 to drive the rear section load
6) For the case of AC power output function in F8, the said U101 is selected to employee the electrical machine with AC power generating functions comprised of a permanent magnet or winding excited, varied frequency driven field type electrical device, or a brushed alternator type electrical device, wherein its armature winding is commonly installed the conducting rings for AC output and the commutators for DC input/output.

TABLE 4

| FUNCTIONS | | B101 | P101 | CL102 |
|---|---|---|---|---|
| F1-A | The engine fuel valve is controlled to drive the engine from low speed to high speed | OFF | 0-MAX | ON |
| F1-B | The engine fuel vale and the U101 is controlled simultaneously to drive the engine from low speed to high speed and to charge the battery simultaneously | OFF | 0-MAX | ON |
| F1-C | The engine is speed controlled or operated at a constant speed, wherein the battery charging current from the U101 is controlled to change the output power to the load; | OFF | *0-MAX OR CONSTANT SPEED | ON |

TABLE 4-continued

| | | | | |
|---|---|---|---|---|
| F1-D | The engine is speed controlled or operated at a constant speed, wherein the U101 generates short cut current to control the output shaft torque, thereby to change the engine speed | OFF | **0-MAX *0-MAX OR CONSTANT SPEED **0-MAX | ON |
| F2 | The U101 is powered by the battery to change the speed or the rotation direction of the rear section load | ON | STOP | OFF |
| F4-A | The engine is operated at a preset speed while the U101 is operated as a motor to provide added power output to drive the rear section load | OFF | 0-MAX OR CONSTANT SPEED | ON |
| F4-B | The engine is operated at a preset speed while the U101 is operated as a motor to provide added power output to drive the front and rear section loads | OFF | 0-MAX CONSTANT SPEED | ON |
| F5 | The U101 is operated as a generator to charge the battery using the recovered rear section kinetic energy | *OFF **ON | *SLOW OR STOP **STOP-MAX | *ON **OFF |
| F6 | The U101 is operated as a generator to charge the battery using the recovered front section kinetic energy | OFF | *SLOW OR STOP **STOP-MAX | *ON **OFF |
| F7 | All the loads are braked by the engine friction damping | OFF | SLOW OR STOP | ON |
| F8 | The system is self charged (It can be stopped at a preset time or controlled by the capacity) through that the U101 is drived by the engine to be operated as a generator to charge the battery or to provide varied or constant frequency AC generation output | OFF | 0-MAX OR CONSTANT SPEED | ON |
| F9 | The U101 is operated as a motor to start the engine | OFF | STOP TO START | ON |
| F10 | Neutral Slide | OFF | STOP OR 0-MAX | OFF |

| FUNCTIONS | | CL103 | CL104 | G/M (U101) | BT101 | REMARK |
|---|---|---|---|---|---|---|
| F1-A | The engine fuel valve is controlled to drive the engine from low speed to high speed | *OFF **ON ***ON | *ON **ON ***OFF | *READY **READY ***READY | *READY **READY ***READY | *Drive the rear section load **Drive the front and rear section loads simultaneously ***Drive the front section load |
| F1-B | The engine fuel vale and the U101 is controlled simultaneously to drive the engine from low speed to high speed and to charge the battery simultaneously | *OFF **ON ***ON | *ON **ON **OFF | GEN- | CHARGE | |
| F1-C | The engine is speed controlled or operated at a constant speed, wherein the battery charging current from the U101 is controlled to change the output power to the load; | *OFF **ON | ON | GEN- | DIS-CHARGE | |
| F1-D | The engine is speed controlled or operated at a constant speed, wherein the U101 generates short cut current to control the output shaft torque, thereby to change the engine speed | *OFF **ON | ON | GEN- | READY | |
| F2 | The U101 is powered by the battery to change the speed or the rotation direction of the rear section load | OFF | ON | MOTOR | DIS-CHARGE | |
| F4-A | The engine is operated at a preset speed while the U101 is operated as a motor to provide added power output to drive the rear section load | OFF | ON | MOTOR | DIS-CHARGE | |
| F4-B | The engine is operated at a preset speed while the U101 is operated as a motor to provide added power output to drive the front and rear section loads | ON | ON | MOTOR | DIS-CHARGE | |
| F5 | The U101 is operated as a generator to charge the battery using the recovered rear section kinetic energy | OFF | ON | GEN- | CHARGE | *The engine piston friction damping is activated simultaneously **Recovery of the kinetic energy |
| F6 | The U101 is operated as a generator to charge the battery using the recovered front section kinetic energy | ON | OFF | GEN- | CHARGE | |
| F7 | All the loads are braked by the engine friction damping | ON | ON | READY | READY | |
| F8 | The system is self charged (It can be stopped at a preset time or controlled by the capacity) through that the U101 is drived by the engine to be operated as a generator to charge the battery or to provide varied or constant frequency AC generation output | OFF | OFF | GEN- | CHARGE | |
| F9 | The U101 is operated as a motor to start the engine | OFF | OFF | MOTOR | DIS-CHARGE | |
| F10 | Neutral Slide | OFF | OFF | READY | READY | |

Notes:
1) CHARGE current of F1-B is load following distributed
2) The U101 is an electrical machine
3) BT101 is the battery TABLE 4-continued 4) GEN- is a generator
5) For the case of engine, the P101 is the drive side rotational power source which is employed to drive the front section load and is series combined with the U101 to drive the rear section load
6) For the case of AC power output function in F8, the said U101 is selected to employee the electrical machine with AC power generating functions comprised of a permanent magnet or winding excited, varied frequency driven field type electrical device, or a brushed alternator type electrical device, wherein its armature winding is commonly installed the conducting rings for AC output and the commutators for DC input/output.

TABLE 5

| FUNCTIONS | | COMPONENTS | | |
|---|---|---|---|---|
| | | B101 | B102 | P101 |
| F1-A | The engine fuel valve is controlled to drive the engine from low speed to high speed | OFF | *OFF<br>OFF<br>*OFF | 0-MAX |
| F1-B | The engine fuel vale and the U101 is controlled simultaneously to drive the engine from low speed to high speed and to charge the battery simultaneously | OFF | *OFF<br>OFF<br>*OFF | 0-MAX |
| F1-C | The engine is speed controlled or operated at a constant speed, wherein the battery charging current from the U101 is controlled to change the output power to the load; | OFF | OFF | *0-MAX OR CONSTANT SPEED<br>**0-MAX |
| F1-D | The engine is speed controlled or operated at a constant speed, wherein the U101 generates short cut current to control the output shaft torque, thereby to change the engine speed | OFF | OFF | *0-MAX OR CONSTANT SPEED<br>**0-MAX |
| F2 | The U101 is powered by the battery to change the speed or the rotation direction of the rear section load | ON | OFF | STOP |
| F3 | The U101 is powered by the battery to change the speed or the rotation direction of the front section load | OFF | ON | STOP |
| F4-A | The engine is operated at a preset speed while the U101 is operated as a motor to provide added power output to drive the rear section load | OFF | OFF | 0-MAX OR CONSTANT SPEED |
| F4-B | The engine is operated at a preset speed while the U101 is operated as a motor to provide added power output to drive the front and rear section loads | OFF | OFF | 0-MAX |
| F5 | The U101 is operated as a generator to charge the battery using the recovered rear section kinetic energy | *OFF<br>**ON | OFF | *SLOW OR STOP<br>**STOP-MAX |
| F6 | The U101 is operated as a generator to charge the battery using the recovered front section kinetic energy | OFF | ON | *SLOW OR STOP<br>**STOP-MAX |
| F7 | All the loads are braked by the engine friction damping | OFF | OFF | SLOW OR STOP |
| F8 | The system is self charged (It can be stopped at a preset time or controlled by the capacity) through that the U101 is drived by the engine to be operated as a generator to charge the battery or to provide varied or constant frequency AC generation output | OFF | ON | 0-MAX OR CONSTANT SPEED |
| F9 | The U101 is operated as a motor to start the engine | OFF | ON | STOP TO START |
| F10 | Neutral Slide | OFF | OFF | STOP OR 0-MAX |
| F11 | The engine is used to drive the front section load, and the U101 is used to drive the rear section load, and both are independently operated | ON | OFF | 0-MAX |
| F12 | The engine is used to drive the front section load and the U101 is pulled to be operated as a generator to charge the battery. | ON | OFF | 0-MAX |

| FUNCTION | | COMPONENTS | | | | |
|---|---|---|---|---|---|---|
| | | CL101 | CL102 | CL103 | CL104 | CL105 |
| F1-A | The engine fuel valve is controlled to drive the engine from low speed to high speed | *ON<br>ON<br>*OFF | ON | *OFF<br>ON<br>*ON | *ON<br>ON<br>*OFF | *ON<br>ON<br>*OFF |
| F1-B | The engine fuel vale and the U101 is controlled simultaneously to drive the engine from low speed to high speed and to charge the battery simultaneously | *OFF | ON | *OFF<br>ON<br>*ON | *ON<br>ON<br>*OFF | *ON<br>ON<br>*OFF |
| F1-C | The engine is speed controlled or operated at a constant speed, wherein the battery charging current from the U101 is controlled to change the output power to the load; | OFF | ON | *OFF<br>**ON | ON | ON |
| F1-D | The engine is speed controlled or operated at a constant speed, wherein the U101 generates short cut current to control the output shaft torque, thereby to change the engine speed | OFF | ON | *OFF<br>**ON | ON | ON |
| F2 | The U101 is powered by the battery to change the speed or the rotation direction of the rear section load | OFF | OFF | OFF | ON | ON |
| F3 | The U101 is powered by the battery to change the speed or the rotation direction of the front section load | OFF | OFF | ON | OFF | OFF |
| F4-A | The engine is operated at a preset speed while the U101 is operated as a motor to provide added power output to drive the rear section load | OFF | ON | OFF | ON | ON |
| F4-B | The engine is operated at a preset speed while the U101 is | OFF | ON | ON | ON | ON |

TABLE 5-continued

| | | | | | | |
|---|---|---|---|---|---|---|
| F5 | operated as a motor to provide added power output to drive the front and rear section loads The U101 is operated as a generator to charge the battery using the recovered rear section kinetic energy | OFF | *ON **OFF | OFF | ON | ON |
| F6 | The U101 is operated as a generator to charge the battery using the recovered front section kinetic energy | OFF | *ON **OFF | ON | OFF | OFF |
| F7 | All the loads are braked by the engine friction damping | OFF | ON | ON | ON | ON |
| F8 | The system is self charged (It can be stopped at a preset time or controlled by the capacity) through that the U101 is drived by the engine to be operated as a generator to charge the battery or to provide varied or constant frequency AC generation output | OFF | ON | OFF | OFF | OFF |
| F9 | The U101 is operated as a motor to start the engine | OFF | ON | OFF | OFF | OFF |
| F10 | Neutral Slide | OFF | OFF | OFF | OFF | OFF |
| F11 | The engine is used to drive the front section load, and the U101 is used to drive the rear section load, and both are independently operated | OFF | ON | ON | ON | OFF |
| F12 | The engine is used to drive the front section load and the U101 is pulled to be operated as a generator to charge the battery. | OFF | ON | ON | ON | OFF |

| | | COMPONENTS | | |
|---|---|---|---|---|
| FUNCTIONS | | G/M (U101) | BT101 | REMARK |
| F1-A | The engine fuel valve is controlled to drive the engine from low speed to high speed | *READY **READY ***READY | *READY **READY ***READY | *Drive the rear section load |
| F1-B | The engine fuel vale and the U101 is controlled simultaneously to drive the engine from low speed to high speed and to charge the battery simultaneously | GEN- | CHARGE | **Drive the front and rear |
| F1-C | The engine is speed controlled or operated at a constant speed, wherein the battery charging current from the U101 is controlled to change the output power to the load; | GEN- | DIS-CHARGE | section loads simultaneously ***Drive |
| F1-D | The engine is speed controlled or operated at a constant speed, wherein the U101 generates short cut current to control the output shaft torque, thereby to change the engine speed | GEN- | READY | the front section load |
| F2 | The U101 is powered by the battery to change the speed or the rotation direction of the rear section load | MOTOR | DIS-CHARGE | |
| F3 | The U101 is powered by the battery to change the speed or the rotation direction of the front section load | MOTOR | DIS-CHARGE | |
| F4-A | The engine is operated at a preset speed while the U101 is operated as a motor to provide added power output to drive the rear section load | MOTOR | DIS-CHARGE | |
| F4-B | The engine is operated at a preset speed while the U101 is operated as a motor to provide added power output to drive the front and rear section loads | MOTOR | DIS-CHARGE | |
| F5 | The U101 is operated as a generator to charge the battery using the recovered rear section kinetic energy | GEN- | CHARGE | *The engine |
| F6 | The U101 is operated as a generator to charge the battery using the recovered front section kinetic energy | GEN- | CHARGE | piston friction damping is activated simultaneously **Recovery of the kinetic energy |
| F7 | All the loads are braked by the engine friction damping | READY | READY | |
| F8 | The system is self charged (It can be stopped at a preset time or controlled by the capacity) through that the U101 is drived by the engine to be operated as a generator to charge the battery or to provide varied or constant frequency AC generation output | GEN- | CHARGE | |
| F9 | The U101 is operated as a motor to start the engine | MOTOR | DIS-CHARGE | |
| F10 | Neutral Slide | READY | READY | |
| F11 | The engine is used to drive the front section load, and the U101 is used to drive the rear section load, and both are independently operated | MOTOR | DIS-CHARGE | |
| F12 | The engine is used to drive the front section load and the U101 is pulled to be operated as a generator to charge the battery. | GEN- | CHARGE | |

Notes:
1) CHARGE current of F1-B is load following distributed

TABLE 5-continued

2) The U101 is an electrical machine
3) BT101 is the battery
4) GEN- is a generator
5) For the case of engine, the P101 is the drive side rotational power source which is employed to drive the front section load and is series combined with the U101 to drive the rear section load
6) For the case of AC power output function in F8, the said U101 is selected to employee the electrical machine with AC power generating functions comprised of a permanent magnet or winding excited, varied frequency driven field type electrical device, or a brushed alternator type electrical device, wherein its armature winding is commonly installed the conducting rings for AC output and the commutators for DC input/output.

TABLE 6

| FUNCTIONS | | COMPONENTS | | |
|---|---|---|---|---|
| | | B101 | B102 | P101 |
| F1-A | The engine fuel valve is controlled to drive the engine from low speed to high speed | OFF | *OFF<br>OFF<br>*OFF | 0-MAX |
| F1-B | The engine fuel vale and the U101 is controlled simultaneously to drive the engine from low speed to high speed and to charge the battery simultaneously | OFF | *OFF<br>OFF<br>*ON | 0-MAX |
| F1-C | The engine is speed controlled or operated at a constant speed, wherein the battery charging current from the U101 is controlled to change the output power to the load; | OFF | OFF | *0-MAX OR CONSTANT SPEED<br>**0-MAX |
| F1-D | The engine is speed controlled or operated at a constant speed, wherein the U101 generates short cut current to control the output shaft torque, thereby to change the engine speed | OFF | OFF | *0-MAX OR CONSTANT SPEED<br>**0-MAX |
| F2 | The U101 is powered by the battery to change the speed or the rotation direction of the rear section load | ON | OFF | STOP |
| F4-A | The engine is operated at a preset speed while the U101 is operated as a motor to provide added power output to drive the rear section load | OFF | OFF | 0-MAX OR CONSTANT SPEED |
| F4-B | The engine is operated at a preset speed while the U101 is operated as a motor to provide added power output to drive the front and rear section loads | OFF | OFF | 0-MAX |
| F5 | The U101 is operated as a generator to charge the battery using the recovered rear section kinetic energy | *OFF<br>**ON | OFF | *SLOW OR STOP<br>**STOP-MAX |
| F7 | All the loads are braked by the engine friction damping | OFF | OFF | SLOW OR STOP |
| F8 | The system is self charged (It can be stopped at a preset time or controlled by the capacity) through that the U101 is drived by the engine to be operated as a generator to charge the battery or to provide varied or constant frequency AC generation output | OFF | ON | 0-MAX OR CONSTANT SPEED |
| F9 | The U101 is operated as a motor to start the engine | OFF | ON | STOP TO START |
| F10 | Neutral Slide | OFF | OFF | STOP OR 0-MAX |
| F11 | The engine is used to drive the front section load, and the U101 is used to drive the rear section load, and both are independently operated | ON | OFF | 0-MAX |
| F12 | The engine is used to drive the front section load and the U101 is pulled to be operated as a generator to charge the battery. | ON | OFF | 0-MAX |

| FUNCTION | | COMPONENTS | | | |
|---|---|---|---|---|---|
| | | B103 | CL102 | CL103 | CL105 |
| F1-A | The engine fuel valve is controlled to drive the engine from low speed to high speed | *ON<br>ON<br>*OFF | ON | *OFF<br>ON<br>*ON | *ON<br>ON<br>*OFF |
| F1-B | The engine fuel vale and the U101 is controlled simultaneously to drive the engine from low speed to high speed and to charge the battery simultaneously | *OFF | ON | *OFF<br>ON<br>*ON | *ON<br>ON<br>*OFF |
| F1-C | The engine is speed controlled or operated at a constant speed, wherein the battery charging current from the U101 is controlled to change the output power to the load; | OFF | ON | *OFF<br>**ON | ON |
| F1-D | The engine is speed controlled or operated at a constant speed, wherein the U101 generates short cut current to control the output shaft torque, thereby to change the engine speed | OFF | ON | *OFF<br>**ON | ON |
| F2 | The U101 is powered by the battery to change the speed or the rotation direction of the rear section load | OFF | OFF | OFF | OFF |
| F4-A | The engine is operated at a preset speed while the U101 is operated as a motor to provide added power output to drive the rear section load | OFF | ON | OFF | ON |
| F4-B | The engine is operated at a preset speed while the U101 is operated as a motor to provide added power output to drive the front and rear section loads | OFF | ON | ON | ON |
| F5 | The U101 is operated as a generator to charge the battery using the recovered rear section kinetic energy | OFF | *ON<br>**OFF | OFF | *ON<br>**OFF |

TABLE 6-continued

| | | | | | |
|---|---|---|---|---|---|
| F7 | All the loads are braked by the engine friction damping | OFF | ON | ON | ON |
| F8 | The system is self charged (It can be stopped at a preset time or controlled by the capacity) through that the U101 is driven by the engine to be operated as a generator to charge the battery or to provide varied or constant frequency AC generation output | OFF | ON | OFF | ON |
| F9 | The U101 is operated as a motor to start the engine | OFF | ON | OFF | ON |
| F10 | Neutral Slide | OFF | OFF | OFF | OFF |
| F11 | The engine is used to drive the front section load, and the U101 is used to drive the rear section load, and both are independently operated | OFF | ON | ON | OFF |
| F12 | The engine is used to drive the front section load and the U101 is pulled to be operated as a generator to charge the battery. | OFF | ON | ON | OFF |

| | | COMPONENTS | | |
|---|---|---|---|---|
| FUNCTIONS | | G/M (U101) | BT101 | REMARK |
| F1-A | The engine fuel valve is controlled to drive the engine from low speed to high speed | *READY **READY ***READY | *READY **READY ***READY | *Drive the rear section load |
| F1-B | The engine fuel vale and the U101 is controlled simultaneously to drive the engine from low speed to high speed and to charge the battery simultaneously | GEN- | CHARGE | **Drive the front and rear section loads simultaneously ***Drive the front section load |
| F1-C | The engine is speed controlled or operated at a constant speed, wherein the battery charging current from the U101 is controlled to change the output power to the load; | GEN- | DIS-CHARGE | |
| F1-D | The engine is speed controlled or operated at a constant speed, wherein the U101 generates short cut current to control the output shaft torque, thereby to change the engine speed | GEN- | READY | |
| F2 | The U101 is powered by the battery to change the speed or the rotation direction of the rear section load | MOTOR | DIS-CHARGE | |
| F4-A | The engine is operated at a preset speed while the U101 is operated as a motor to provide added power output to drive the rear section load | MOTOR | DIS-CHARGE | |
| F4-B | The engine is operated at a preset speed while the U101 is operated as a motor to provide added power output to drive the front and rear section loads | MOTOR | DIS-CHARGE | |
| F5 | The U101 is operated as a generator to charge the battery using the recovered rear section kinetic energy | GEN- | CHARGE | *The engine piston friction damping is activated simultaneously **Recovery of the kinetic energy |
| F7 | All the loads are braked by the engine friction damping | READY | READY | |
| F8 | The system is self charged (It can be stopped at a preset time or controlled by the capacity) through that the U101 is driven by the engine to be operated as a generator to charge the battery or to provide varied or constant frequency AC generation output | GEN- | CHARGE | The operation is limited to when the engine is stopped |
| F9 | The U101 is operated as a motor to start the engine | MOTOR | DIS-CHARGE | |
| F10 | Neutral Slide | READY | READY | |
| F11 | The engine is used to drive the front section load, and the U101 is used to drive the rear section load, and both are independently operated | MOTOR | DIS-CHARGE | |
| F12 | The engine is used to drive the front section load and the U101 is pulled to be operated as a generator to charge the battery. | GEN- | CHARGE | |

Notes:
1) CHARGE current of F1-B is load following distributed
2) The U101 is an electrical machine
3) BT101 is the battery
4) GEN- is a generator
5) For the case of engine, the P101 is the drive side rotational power source which is employed to drive the front section load and is series combined with the U101 to drive the rear section load
6) For the case of AC power output function in F8, the said U101 is selected to employee the electrical machine with AC power generating functions comprised of a permanent magnet or winding excited, varied frequency driven field type electrical device, or a brushed alternator type electrical device, wherein its armature winding is commonly installed the conducting rings for AC output and the commutators for DC input/output.

TABLE 7

| FUNCTIONS | | COMPONENTS | | |
|---|---|---|---|---|
| | | B101 | P101 | B103 |
| F1-A | The engine fuel valve is controlled to drive the engine from low speed to high speed | OFF | 0-MAX | *ON<br>ON<br>*OFF |
| F1-B | The engine fuel vale and the U101 is controlled simultaneously to drive the engine from low speed to high speed and to charge the battery simultaneously | OFF | 0-MAX | *OFF |
| F1-C | The engine is speed controlled or operated at a constant speed, wherein the battery charging current from the U101 is controlled to change the output power to the load; | OFF | *0-MAX OR CONSTANT SPEED **0-MAX | OFF |
| F1-D | The engine is speed controlled or operated at a constant speed, wherein the U101 generates short cut current to control the output shaft torque, thereby to change the engine speed | OFF | *0-MAX OR CONSTANT SPEED **0-MAX | OFF |
| F2 | The U101 is powered by the battery to change the speed or the rotation direction of the rear section load | ON | STOP | OFF |
| F4-A | The engine is operated at a preset speed while the U101 is operated as a motor to provide added power output to drive the rear section load | OFF | 0-MAX OR CONSTANT SPEED | OFF |
| F4-B | The engine is operated at a preset speed while the U101 is operated as a motor to provide added power output to drive the front and rear section loads | OFF | 0-MAX | OFF |
| F5 | The U101 is operated as a generator to charge the battery using the recovered rear section kinetic energy | *OFF<br>**ON | *SLOW OR STOP **STOP-MAX | OFF |
| F7 | All the loads are braked by the engine friction damping | OFF | SLOW OR STOP | OFF |
| F8 | The system is self charged (It can be stopped at a preset time or controlled by the capacity) through that the U101 is driven by the engine to be operated as a generator to charge the battery or to provide varied or constant frequency AC generation output | OFF | 0-MAX OR CONSTANT SPEED | OFF |
| F9 | The U101 is operated as a motor to start the engine | OFF | STOP TO START | OFF |
| F10 | Neutral Slide | OFF | STOP OR 0-MAX | OFF |
| F11 | The engine is used to drive the front section load, and the U101 is used to drive the rear section load, and both are independently operated | ON | 0-MAX | OFF |
| F12 | The engine is used to drive the front section load and the U101 is pulled to be operated as a generator to charge the battery. | ON | 0-MAX | OFF |

| FUNCTION | | COMPONENTS | | |
|---|---|---|---|---|
| | | CL102 | CL103 | CL105 |
| F1-A | The engine fuel valve is controlled to drive the engine from low speed to high speed | ON | *OFF<br>ON<br>*ON | *ON<br>ON<br>*OFF |
| F1-B | The engine fuel vale and the U101 is controlled simultaneously to drive the engine from low speed to high speed and to charge the battery simultaneously | ON | *OFF<br>ON<br>*ON | *ON<br>ON<br>*OFF |
| F1-C | The engine is speed controlled or operated at a constant speed, wherein the battery charging current from the U101 is controlled to change the output power to the load; | ON | *OFF<br>**ON | ON |
| F1-D | The engine is speed controlled or operated at a constant speed, wherein the U101 generates short cut current to control the output shaft torque, thereby to change the engine speed | ON | *OFF<br>**ON | ON |
| F2 | The U101 is powered by the battery to change the speed or the rotation direction of the rear section load | OFF | OFF | OFF |
| F4-A | The engine is operated at a preset speed while the U101 is operated as a motor to provide added power output to drive the rear section load | ON | OFF | ON |
| F4-B | The engine is operated at a preset speed while the U101 is operated as a motor to provide added power output to drive the front and rear section loads | ON | ON | ON |
| F5 | The U101 is operated as a generator to charge the battery using the recovered rear section kinetic energy | *ON<br>**OFF | OFF | *ON<br>**OFF |
| F7 | All the loads are braked by the engine friction damping | ON | ON | ON |
| F8 | The system is self charged (It can be stopped at a preset time or controlled by the capacity) through that the U101 is driven by the engine to be operated as a generator to charge the battery or to provide varied or constant frequency AC generation output | ON | OFF | ON |
| F9 | The U101 is operated as a motor to start the engine | ON | OFF | ON |
| F10 | Neutral Slide | OFF | OFF | OFF |
| F11 | The engine is used to drive the front section load, and the U101 is used to drive the rear section load, and both are independently operated | ON | ON | OFF |

TABLE 7-continued

| | | | | |
|---|---|---|---|---|
| F12 | The engine is used to drive the front section load and the U101 is pulled to be operated as a generator to charge the battery. | ON | ON | OFF |

| | | COMPONENTS | | |
|---|---|---|---|---|
| FUNCTIONS | | G/M (U101) | BT101 | REMARK |
| F1-A | The engine fuel valve is controlled to drive the engine from low speed to high speed | *READY **READY ***READY | *READY **READY ***READY | *Drive the rear section load |
| F1-B | The engine fuel vale and the U101 is controlled simultaneously to drive the engine from low speed to high speed and to charge the battery simultaneously | GEN- | CHARGE | **Drive the front and rear section loads simultaneously ***Drive the front section load |
| F1-C | The engine is speed controlled or operated at a constant speed, wherein the battery charging current from the U101 is controlled to change the output power to the load; | GEN- | DIS-CHARGE | |
| F1-D | The engine is speed controlled or operated at a constant speed, wherein the U101 generates short cut current to control the output shaft torque, thereby to change the engine speed | GEN- | READY | |
| F2 | The U101 is powered by the battery to change the speed or the rotation direction of the rear section load | MOTOR | DIS-CHARGE | |
| F4-A | The engine is operated at a preset speed while the U101 is operated as a motor to provide added power output to drive the rear section load | MOTOR | DIS-CHARGE | |
| F4-B | The engine is operated at a preset speed while the U101 is operated as a motor to provide added power output to drive the front and rear section loads | MOTOR | DIS-CHARGE | |
| F5 | The U101 is operated as a generator to charge the battery using the recovered rear section kinetic energy | GEN- | CHARGE | *The engine piston friction damping is activated simultaneously **Recovery of the kinetic energy |
| F7 | All the loads are braked by the engine friction damping | READY | READY | |
| F8 | The system is self charged (It can be stopped at a preset time or controlled by the capacity) through that the U101 is driven by the engine to be operated as a generator to charge the battery or to provide varied or constant frequency AC generation output | GEN- | CHARGE | The operation is limited to when the engine is stopped and the rear load brake is locked. |
| F9 | The U101 is operated as a motor to start the engine | MOTOR | DIS-CHARGE | |
| F10 | Neutral Slide | READY | READY | |
| F11 | The engine is used to drive the rear section load, and the U101 is used to drive the rear section load, and both are independently operated | MOTOR | DIS-CHARGE | |
| F12 | The engine is used to drive the front section load and the U101 is pulled to be operated as a generator to charge the battery. | GEN- | CHARGE | |

Notes:
1) CHARGE current of F1-B is load following distributed
2) The U101 is an electrical machine
3) BT101 is the battery
4) GEN- is a generator
5) For the case of engine, the P101 is the drive side rotational power source which is employed to drive the front section load and is series combined with the U101 to drive the rear section load
6) For the case of AC power output function in F8, the said U101 is selected to employee the electrical machine with AC power generating functions comprised of a permanent magnet or winding excited, varied frequency driven field type electrical device, or a brushed alternator type electrical device, wherein its armature winding is commonly installed the conducting rings for AC output and the commutators for DC input/output.

TABLE 8

| | | COMPONENTS | | | |
|---|---|---|---|---|---|
| FUNCTIONS | | B101 | P101 | C102 | CL103 |
| F1-A | The engine fuel valve is controlled to drive the engine from | OFF | 0-MAX | ON | *OFF |

TABLE 8-continued

| FUNCTIONS | | | | | | CL105 | G/M (U101) | BT101 | REMARK |
|---|---|---|---|---|---|---|---|---|---|
| | low speed to high speed | | | | **ON ***ON | | | | |
| F1-B | The engine fuel vale and the U101 is controlled simultaneously to drive the engine from low speed to high speed and to charge the battery simultaneously | OFF | 0-MAX | ON | *OFF **ON ***ON | *ON **ON ***OFF | GEN- | CHARGE | *Drive the rear section load **Drive the front and rear section loads simultaneously ***Drive the front section load |
| F1-C | The engine is speed controlled or operated at a constant speed, wherein the battery charging current from the U101 is controlled to change the output power to the load; | OFF | *0-MAX OR CONSTANT SPEED **0-MAX | ON | *OFF **ON | ON | GEN- | DIS-CHARGE | |
| F1-D | The engine is speed controlled or operated at a constant speed, wherein the U101 generates short cut current to control the output shaft torque, thereby to change the engine speed | OFF | *0-MAX OR CONSTANT SPEED **0-MAX | ON | *OFF **ON | ON | GEN- | READY | |
| F2 | The U101 is powered by the battery to change the speed or the rotation direction of the rear section load | ON | STOP | OFF | OFF | OFF | MOTOR | DIS-CHARGE | |
| F4-A | The engine is operated at a preset speed while the U101 is operated as a motor to provide added power output to drive the rear section load | OFF | 0-MAX OR CONSTANT SPEED | ON | OFF | ON | MOTOR | DIS-CHARGE | |
| F4-B | The engine is operated at a preset speed while the U101 is operated as a motor to provide added power output to drive the front and rear section loads | OFF | 0-MAX | ON | ON | ON | MOTOR | DIS-CHARGE | |
| F5 | The U101 is operated as a generator to charge the battery using the recovered rear section kinetic energy | *OFF **ON | *SLOW OR STOP **STOP-MAX | *ON **OFF | OFF | *ON **OFF | GEN- | CHARGE | *The engine piston friction damping is activated simultaneously **Recovery of the kinetic energy |
| F7 | All the loads are braked by the engine friction damping | OFF | SLOW OR STOP | ON | ON | ON | READY | READY | |
| F8 | The system is self charged (It can be stopped at a preset time or controlled by the capacity) through that the U101 is dried by the engine to be operated as a generator to charge the battery or to provide varied or constant frequency AC generation output | OFF | 0-MAX OR CONSTANT SPEED | ON | OFF | ON | GEN- | CHARGE | The operation |
| F9 | The U101 is operated as a motor to start the engine | OFF | STOP TO START | ON | OFF | | | | |
| F10 | Neutral Slide | OFF | STOP OR 0-MAX | OFF | OFF | | | | |
| F11 | The engine is used to drive the front section load, and the U101 is used to drive the rear section load, and both are independently operated | ON | 0-MAX | ON | ON | | | | |
| F12 | The engine is used to drive the front section load and the U101 is pulled to be operated as a generator to charge the battery. | ON | 0-MAX | ON | ON | | | | |

| FUNCTIONS | | CL105 | G/M (U101) | BT101 | REMARK |
|---|---|---|---|---|---|
| F1-A | The engine fuel valve is controlled to drive the engine from low speed to high speed | *OFF **ON ***OFF | *READY **READY ***READY | *READY **READY ***READY | *Drive the rear section load **Drive the front and rear section loads simultaneously ***Drive the front section load |

TABLE 8-continued

|  |  |  |  |  |  |
|---|---|---|---|---|---|
|  | by the engine to be operated as a generator to charge the battery or to provide varied or constant frequency AC generation output |  |  |  | is limited to when the engine is stopped |
| F9 | The U101 is operated as a motor to start the engine | ON | MOTOR | DIS-CHARGE | and the rear load brake is locked. |
| F10 | Neutral Slide | OFF | READY | READY |  |
| F11 | The engine is used to drive the front section load, and the U101 is used to drive the rear section load, and both are independently operated | OFF | MOTOR | DIS-CHARGE |  |
| F12 | The engine is used to drive the front section load and the U101 is pulled to be operated as a generator to charge the battery. | OFF | GEN- | CHARGE |  |

Notes:
1) CHARGE current of F1-B is load following distributed
2) The U101 is an electrical machine
3) BT101 is the battery
4) GEN- is a generator
5) For the case of engine, the P101 is the drive side rotational power source which is employed to drive the front section load and is series combined with the U101 to drive the rear section load
6) For the case of AC power output function in F8, the said U101 is selected to employee the electrical machine with AC power generating functions comprised of a permanent magnet or winding excited, varied frequency driven field type electrical device, or a brushed alternator type electrical device, wherein its armature winding is commonly installed the conducting rings for AC output and the commutators for DC input/output.

I claim:

1. A differential mixing combined power distribution system for use in rotational driving applications, a rotational output shaft of a rotational power source coupled to drive a front section load, and also coupled with the input shaft of a differential mixing drive unit to drive a differentially acting two-sided rear section load, wherein the differential mixing drive device comprises an electrical machine combined with a differential gear transmission system; and further comprising a brake installed between a rotor and a stator of the electrical machine, and means for controlling the brake to generate motor driving functions when an input current is applied and the electric machine is employed as a motor, or to generate variable speed coupling functions through an output current when the electrode machine is employed as a generator, the electric machine also being used for starting the engine and as a power regeneration brake when the engine is the main power source for the front and rear section loads, the electric machine being connected to charge the battery at which time a speed difference with the rear load section can be adjusted by controlling the charging current, wherein the rotational power source can be driven at a constant speed and at a partially adjustable speed to improve operating efficiency and decrease pollution, with one part of the differential speed output power generated through the differential mixing drive device being used for driving the load while the remainder of the output power is converted through the generator function of the electrical machine of the differential mixing drive device to charge the battery.

2. A differential mixing combined power distribution system, comprising:

a drive side rotational power source (P101) having an output which is first supplied to a front section load and is then transmitted to an input end of a differential mixing drive device (M101) to drive a rear section load;

the drive side rotational power source (P101) including a rotational output shaft (S102) coupled to a middle transmission device and a control interface (M102) through a clutch (CL102), the rotational power source further including a speed sensor (SD101) to transmit the engine rotation signal to a central controller (CCU101) and a controllable fuel valve (CG101) controlled by the central controller (CCU101) to carry out the functions of changing the engine speed and keeping the engine maintained at a constant speed;

the middle transmission device and control interface (M102) including a speed change control system for driving the front section lead only and also for driving both loads;

a middle input shaft (S101) coupled at the output end of the clutch (CL102);

a brake (B101) controlled by the central controller CCU101 and installed between the middle shaft (S101) and a fixed casing;

a differential mixing drive device (M101) including an electric machine (U101) connected to a battery (BT101) and combined with a differential transmission system coupled with the transmission middle shaft (S101) and driven by the drive side rotational power unit, and also coupled with the input shaft of the rear differential gear box (GB101) through a clutch (CL104) to drive the rear section lead;

a drive circuit device (D101) installed between the electrical machine (U101) and the battery (BT101) and arranged to receive operating commands from the central controller (CCU101) to control the electrical machine (U101) to at least carry out the functions of driving the front section lead, starting the engine, and providing power generation at standstill, the electrical machine (U101) being driven by the engine at standstill to function as a generator to charge the battery and supply power to any other loads connected thereto.

3. A system as claimed in claim 2, wherein the electrical machine is arranged such that a rotational speed of the rotor is increased with a decreasing load on the rotor.

4. A system as claimed in claim 2, wherein the electrical machine is arranged to be controlled by the drive circuit (D101) to provide additional torque on a driven load.

5. A system as claimed in claim 2, further comprising a brake (B103) installed between a rotor and stator of the electrical machine and arranged to be controlled by the central controller (CCU101) to thereby provide a direct mechanical synchronous interlock for the rotor and stator of the electrical machine (U101).

6. A system as claimed in claim 5, further comprising a brake (B 102) located between the differentially acting output shafts of the differential mixing drive device (M101) and the coupled rear differential gear box.

7. A system as claimed in claim 6, further comprising a clutch (CL104) positioned between the brake (B102) and the rear section load.

8. A system as claimed in claim 5, further comprising a (clutch CL103) installed between the middle input shaft (S101) and the front section load to provide a transmission coupling between the middle transmission device and the front section load.

9. A system as claimed in claim 8, further comprising a braise (B102) located between the differentially acting output shafts of the differential mixing drive device (M101) and the coupled rear differential gear box.

10. A system as claimed in claim 9, further comprising a clutch (CL104) positioned between the brake (B102) and the rear section load.

11. A system as claimed in claim 10, wherein the central controller includes means for causing the system to carry out the following functions:

controlling the engine fuel valve to drive the engine from low speed to high speed;

controlling the engine fuel valve and the electrical machine simultaneously to drive the engine from low speed to high speed and to charge the battery simultaneously;

changing a speed of the engine by causing the electrical machine to generate a current for controlling an output shaft torque;

causing the electrical machine to be powered by the battery to change a rotation direction of the rear section load;

powering the electrical machine by the battery to change a speed or direction of the front section load;

operating the engine at a preset speed while the electrical machine is operated as a motor to provide additional power for driving the rear section load;

operating the engine as a generator to charge the battery using kinetic energy recovered from the rear section load;

operating the electrical machine as a generator to charge the battery using kinetic energy recovered from the front section load;

causing all loads to be braked by engine friction damping; and causing the electrical machine to be driven by the engine to function as generator for charging the battery and to provide an electrical output to any additional loads connected thereto, 12. A system as claimed in claim 9, wherein the central controller includes means for causing the system to carry out the following functions:

controlling the engine fuel valve to drive the engine from low speed to high speed;

controlling the engine fuel valve and the electrical machine simultaneously to drive the engine from low speed to high speed and to charge the battery simultaneously;

changing a speed of the engine by causing the electrical machine to generate a current for controlling an output shaft torque;

causing the electrical machine to be powered by the battery to change a rotation direction of the rear section load;

operating the engine at a preset speed while the electrical machine is operated as a motor to provide additional power for driving the rear section load;

operating the engine as a generator to charge the battery using kinetic energy recovered from the rear section load;

causing all loads to be braked by engine friction damping; and causing the electrical machine to be driven by the engine to function as generator for charging the battery and to provide an electrical output to any additional loads connected thereto, 13. The system as in claim 8, wherein the central controller includes means for causing the system to carry out the following functions:

controlling the engine fuel valve to drive the engine from low speed to high speed;

controlling the engine fuel valve and the electrical machine simultaneously to drive the engine from low speed to high speed and to charge the battery simultaneously;

changing a speed of the engine by causing the electrical machine to generate a current for controlling an output shaft torque;

causing the electrical machine to be powered by the battery to change a rotation direction of the rear section load;

operating the engine at a present speed while the electrical machine is operated as a motor to provide additional power for driving the rear section load;

operating the engine as a generator to charge the battery using kinetic energy recovered from the rear section load;

causing all loads to be braked by engine friction damping; and causing the electrical machine to be driven by the engine to function as generator for charging the battery and to provide an electrical output to any additional loads connected thereto.

14. A system as claimed in claim 7, wherein the central controller includes means for causing the system to carry out the following functions:

controlling the engine fuel valve to drive the engine from low speed to high speed;

controlling the engine fuel valve and the electrical machine simultaneously to drive the engine from low speed to high speed and to charge the battery simultaneously;

changing a speed of the engine by causing the electrical machine to generate a current for controlling an output shaft torque;

causing the electrical machine to be powered by the battery to change a rotation direction of the rear section load;

operating the engine at a preset speed while the electrical machine is operated as a motor to provide additional power for driving the rear section load;

operating the engine as a generator to charge the battery using kinetic energy recovered from the rear section load;

operating the engine as a generator to charge the battery using kinetic energy recovered from the front section load;

causing all loads to be braked by engine friction damping; and causing the electrical machine to be driven by the engine to function as generator for charging the battery and to provide an electrical output to any additional loads connected thereto.

15. A system as claimed in claim 7, further including a clutch (CL105) between the rear section output middle shaft and the middle transmission device, wherein the central controller includes means for causing the system to carry out the following functions:

controlling the engine fuel valve to drive the engine from low speed to high speed;

controlling the engine fuel valve and the electrical machine simultaneously to drive the engine from low speed to high speed and to charge the battery simultaneously;

changing a speed of the engine by causing the electrical machine to generate a current for controlling an output shaft torque;

causing the electrical machine to be powered by the battery to change a rotation direction of the rear section load;

causing the electrical machine to be powered by the battery to change a rotation or speed of the front section load;

operating the engine at a preset speed while the electrical machine is operated as a motor to provide additional power for driving the rear section load;

operating the engine as a generator to charge the battery using kinetic energy recovered from the rear section load;

operating the engine as a generator to charge the battery using kinetic energy recovered from the front section load;

causing all loads to be braked by engine friction damping;

causing the electrical machine to be driven by the engine to function as generator for charging the battery and to provide an electrical output to any additional loads connected thereto;

operating the engine to drive the front section load and independently operating the electrical machine to drive the rear section load; and operating the engine to drive the front section load and causing the engine to also drive the electrical machine to charge the battery.

16. A system as claimed in claim 6, further comprising clutch (CL105) between the rear section output middle shaft and the middle transmission device, wherein the central controller includes means for causing the system to carry out the following functions:

controlling the engine fuel valve to drive the engine from low speed to high speed;

controlling the engine fuel valve and the electrical machine simultaneously to drive the engine from low speed to high speed and to charge the battery simultaneously;

changing a speed of the engine by causing the electrical machine to generate a current for controlling an output shaft torque;

causing the electrical machine to be powered by the battery to change a rotation direction of the rear section load;

causing the electrical machine to be powered by the battery to change a rotation or speed of the front section load;

operating the engine at a preset speed while the electrical machine is operated as a motor to provide additional power for driving the rear section load;

operating the engine as a generator to charge the battery using kinetic energy recovered from the rear section load;

causing all loads to be braked by engine friction damping;

causing the electrical machine to be driven by the engine to function as generator for charging the battery and to provide an electrical output to any additional loads connected thereto;

operating the engine to drive the front section load and independently operating the electrical machine to drive the rear section load; and operating the engine to drive the front section load and causing the engine to also drive the electrical machine to charge the battery.

17. A system as claimed in claim 8, further comprising a clutch (CL105) between the rear section output middle shaft and the middle transmission device, wherein the central controller includes means for causing the system to carry out the following functions:

controlling the engine fuel valve to drive the engine from low speed to high speed;

controlling the engine fuel valve and the electrical machine simultaneously to drive the engine from low speed to high speed and to charge the battery simultaneously;

changing a speed of the engine by causing the electrical machine to generate a current for controlling an output shaft torque;

causing the electrical machine to be powered by the battery to change a rotation direction of the rear section load;

causing the electrical machine to be powered by the battery to change a rotation or speed of the front section load;

operating the engine at a preset speed while the electrical machine is operated as a motor to provide additional power for driving the rear section load;

operating the engine as a generator to charge the battery using kinetic energy recovered from the rear section load;

causing all loads to be braked by engine friction damping;

causing the electrical machine to be driven by the engine to function as generator for charging the battery and to provide an electrical output to any additional loads connected thereto;

operating the engine to drive the front section load and independently operating the electrical machine to drive the rear section load; and operating the engine to drive the front section load and causing the engine to also drive the electrical machine to charge the battery.

18. A system as claimed in claim 2, further comprising a clutch (CL103) installed between the middle input shaft (S101) and the front section load to provide a transmission coupling between the middle transmission device and the front section load, and a clutch (CL105) between the rear section output middle shaft and the middle transmission device, wherein the central controller includes means for causing the system to carry out the following functions:

controlling the engine fuel valve to drive the engine from low speed to high speed;

controlling the engine fuel valve and the electrical machine simultaneously to drive the engine from low speed to high speed and to charge the battery simultaneously;

changing a speed of the engine by causing the electrical machine to generate a current for controlling an output shaft torque;

causing the electrical machine to be powered by the battery to change a rotation direction of the rear section load;

causing the electrical machine to be powered by the battery to change a rotation or speed of the front section load;

operating the engine at a preset speed while the electrical machine is operated as a motor to provide additional power for driving the rear section load;

operating the engine as a generator to charge the battery using kinetic energy recovered from the rear section load;

causing all loads to be braked by engine friction damping;

causing the electrical machine to be driven by the engine to function as generator for charging the battery and to provide an electrical output to any additional loads connected thereto;

operating the engine to drive the front section load and independently operating the electrical machine to drive the rear section load; and operating the engine to drive the front section load and causing the engine to also drive the electrical machine to charge the battery.

19. A system as claimed in claim 2, wherein the front and rear section loads are wheels and relationships between the front and rear section loads is set not to operate according to the wheel system ratio relationship, but to operate through a differentially acting adjustment by the electrical machine (U101).

20. A system as claimed in claim 19, wherein the differentially acting adjustment of the electrical machine (U101) includes an active adjustment of the input power when the electrical machine functions as a motor and a passive adjustment of the output power when the electrical machine functions as a generator.

21. A system as claimed in claim 2, wherein the front section load is one of front and rear sets of wheels of a vehicle, and the rear section load is the other of the front and rear sets of wheels.

22. A system as claimed in claim 2, wherein said transmission gear system includes two differential output shafts and an input shaft coupled with the electrical device through a transmission gear, the two wheel shafts of the differential gears being respectively coupled with a transmission middle shaft driven by the rotational power source and with the input shaft of a rear differential gear box through a clutch to drive the two-side differentially acting rear section load.

23. A system as claimed in claim 2, wherein said transmission gear system comprising a planetary gear train and a friction wheel.

* * * * *